US010504140B2

(12) United States Patent
Parekh

(10) Patent No.: US 10,504,140 B2
(45) Date of Patent: Dec. 10, 2019

(54) METHOD AND SYSTEM FOR PROVIDING A DIGITAL GIFT CARD

(71) Applicant: Mastercard International Incorporated, Purchase, NY (US)

(72) Inventor: Pravin Parekh, Pune (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 443 days.

(21) Appl. No.: 15/360,280

(22) Filed: Nov. 23, 2016

(65) Prior Publication Data

US 2017/0161781 A1 Jun. 8, 2017

(30) Foreign Application Priority Data

Dec. 2, 2015 (SG) .............................. 10201509891U

(51) Int. Cl.
*G06Q 40/00* (2012.01)
*G06Q 30/02* (2012.01)
(Continued)

(52) U.S. Cl.
CPC ......... *G06Q 30/0253* (2013.01); *G06Q 20/36* (2013.01); *G06Q 30/0257* (2013.01); *G06Q 30/0269* (2013.01); *G06Q 50/01* (2013.01)

(58) Field of Classification Search
CPC .... G06Q 30/02; G06Q 30/0253; G06Q 20/36; G06Q 30/0257; G06Q 30/0269; G06Q 50/01
(Continued)

(56) References Cited

U.S. PATENT DOCUMENTS

2012/0143752 A1 6/2012 Wong et al.
2012/0226614 A1* 9/2012 Gura ..................... G06Q 20/12
705/44
(Continued)

FOREIGN PATENT DOCUMENTS

CA 2828791 A1 * 9/2012 ............. G06Q 30/06

OTHER PUBLICATIONS

Wireless News: "ACTV8.me Introduces Digital Wallets for Viewers Interacting with TV Shows", Jacksonville (Year: 2012).*
(Continued)

*Primary Examiner* — Edward J Baird
(74) *Attorney, Agent, or Firm* — Buchanan Ingersoll & Rooney PC

(57) ABSTRACT

A method of providing a digital gift card to a beneficiary, the method including, in one or more electronic processing devices: receiving, from a digital wallet of an individual, a request to create a digital gift card including information indicative of at least one of: an occasion associated with the digital gift card and beneficiary information associated with the beneficiary; determining, based on at least one of the occasion and the beneficiary information, a plurality of gift card offers offered by respective merchants; presenting, from the digital wallet, the plurality of gift card offers; receiving, from the digital wallet, an indication of a selected gift card offer; processing a payment from the digital wallet to the merchant offering the selected gift card offer; and sending a digital gift card notification for the selected gift card offer to the beneficiary, to thereby allow the beneficiary to obtain and redeem it.

27 Claims, 16 Drawing Sheets

(51) Int. Cl.
*G06Q 20/36* (2012.01)
*G06Q 50/00* (2012.01)

(58) Field of Classification Search
USPC .................................................. 705/35–40
See application file for complete search history.

(56) References Cited

U.S. PATENT DOCUMENTS

| | | | | |
|---|---|---|---|---|
| 2013/0134216 A1* | 5/2013 | Spodak | ................ | G06K 19/072 235/380 |
| 2013/0191227 A1 | 7/2013 | Pasa et al. | | |
| 2013/0290203 A1* | 10/2013 | Purves | ................... | G06Q 50/01 705/319 |
| 2013/0297504 A1 | 11/2013 | Nwokolo et al. | | |
| 2014/0052617 A1* | 2/2014 | Chawla | ................. | G06Q 20/12 705/39 |
| 2014/0136353 A1* | 5/2014 | Goldman | ............. | G06Q 20/405 705/21 |
| 2014/0200997 A1* | 7/2014 | Anderson | ............ | G06Q 20/227 705/14.53 |
| 2014/0207680 A1* | 7/2014 | Rephlo | ................ | G06Q 20/322 705/44 |
| 2016/0012465 A1* | 1/2016 | Sharp | .................... | G06Q 20/18 705/14.17 |
| 2016/0267472 A1* | 9/2016 | Lingham | ............ | G06Q 20/3676 |

OTHER PUBLICATIONS

MasterCard SecureCode, Merchant Implementation Guide, 17 Jun. 2014 (72 pages); https://www.mastercard.us/content/dam/mccom/en-us/documents/SMI_Manual.pdf.

EMVCo Payment Tokenisation Specification Technical Framework v1.0, Mar. 2014, (84 pages); http://www.emvco.com/specifications.aspx?id=263.

* cited by examiner

METHOD AND SYSTEM FOR PROVIDING A DIGITAL GIFT CARD

TECHNICAL FIELD

This invention relates to a method and system for providing a digital gift card, in particular using a digital wallet platform.

BACKGROUND

Cash is extensively given as a gift on occasions such as weddings, birthdays, anniversaries, house warming ceremonies, festivals, the birth of a child, etc. A cash gift may avoid problems associated with receiving an incorrect or unwanted gift, such as disappointment and/or the hassle of attempting to exchange the gift.

However, giving cash may not be socially acceptable in all circumstances and may be considered impersonal. Large quantities of physical cash may also be difficult to safely deliver to the recipient, may be easily lost and may be targeted for theft.

Gift cards have risen in popularity as an alternative to cash gifts. Typically, a gift card will be obtained from a merchant such that the recipient is restricted to making purchases from that merchant using the gift card. This allows the giver to select a particular merchant that is likely to offer goods or services desired by the recipient, but still provide the recipient with the flexibility to select a specific gift for purchase.

However, gift cards rely on use of a physical card and generally do not involve any security measures and thus, like cash, are still prone to loss or theft. Furthermore, there is generally minimal scope for personalisation of a gift card since this will need to be selected from a limited range of physical cards.

Moreover, a gift card can be less convenient than cash due to the need for the giver to purchase the gift card from the merchant, the need for the merchant to carry an inventory of physical cards for purchase, and the need for the recipient to carry a physical card until the gift card is ultimately redeemed with the merchant.

Electronic funds transfer methods can allow funds to be given to a recipient in a significantly more secure manner than physical cash. However, a gift of electronically transferred funds is generally seen as being even more impersonal than a gift of physical cash, since the only tangible result is an increase in the recipient's account balance.

A digital wallet (also known as an electronic wallet) can allow an individual to make electronic commerce transactions, for example to purchase products online using a computer or at a store using a smartphone. Whilst some digital wallet implementations can also allow an individual to transfer funds to another individual, a funds transfer using a digital wallet will have similar downsides as discussed above for other electronically transferred funds.

In the electronic commerce environment, consumers and corporate purchasers generally interact with merchants from personal computers or mobile computing devices such as smartphones. A cardholder (or account holder—a physical card is not necessary) uses a payment account number or card (or other payment device) that has been issued by an issuer. A secure transaction protocol ensures that the cardholder's interactions with the merchant, and specifically the payment card account information, remain confidential.

As used herein, a "payment card" or "payment device" refers to any suitable cashless payment device, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, transponder devices, NFC-enabled devices, tablets and/or computers.

The typical participants, entities or components (in addition to the account holder) involved in a payment transaction are the issuer, the merchant, the acquirer and (optionally) a payment gateway, each of which can be described as follows:

1. An issuer is a financial institution that establishes an account for a cardholder and most often issues the payment card. The issuer guarantees payment for authorized transactions using the payment card in accordance with payment card brand regulations and local legislation.
2. A merchant offers goods for sale or provides services in exchange for payment. The merchant can offer its cardholders secure electronic interactions. A merchant that accepts payment cards must have a relationship with an acquirer, which is the financial institution that establishes an account with a merchant and processes payment card authorizations and payments.
3. A payment gateway is a device operated by an acquirer or a designated third party that processes merchant payment messages, including payment instructions from cardholders.

In one known form of secure transaction, the 3-D Secure protocol may be used to add a security layer to online e-commerce transactions. Two implementations of 3-D Secure are known as Verified by Visa and MasterCard SecureCode.

Verified by Visa Acquirer and Merchant Implementation Guide (https://usa.visa.com/dam/VCOM/download/merchants/verified-by-visa-acquirer-mechant-implementation-guide.pdf) describes a 3-D Secure online program designed to make Internet purchase transactions safer by authenticating a cardholder's identity at the time of purchase, before the merchant submits an authorization request. This document, in its entirety, is hereby incorporated into this specification for all purposes by way of reference.

MasterCard Secure Code (https://mastercard.us/content/dam/mccom/en-us/documents/SMI_Manual.pdf) describes another 3-D Secure online program. This document, in its entirety, is hereby incorporated into this specification for all purposes by way of reference. U.S. patent application Ser. No. 13/209,312 (Wong) generally discloses a phone-based electronic wallet that provides transactions across multiple channels of commerce. The electronic wallet described therein can be used for point of sale payments, remote mobile payments and/or web based payments. The disclosure of U.S. patent application Ser. No. 13/209,312 in its entirety is hereby incorporated into this specification by way of reference.

FIG. 1 is a flow chart depicting the wallet application being used in an e-commerce transaction (e.g., a phone-initiated transaction) with an online PIN. Paragraph 39 of Wong provides the following summary of with reference to that Figure:

In step 300, the consumer selects the "wallet" icon on the merchant's site. The consumer then selects the wallet application (step 302), which then displays a log in form (step 304). Alternatively, the wallet may be auto-detected. The consumer logs in at step 306, views the listed cards at step 308, and thereafter selects the appropriate payment card and shipping details (step 310). At step 312, the wallet questions whether an online PIN is associated with the card. The existence of the online PIN is confirmed at step 314. In step 316, the wallet requests entry of the online PIN into the phone. The online PIN is entered at step 318. Thereafter, the online PIN is encrypted (step 320), and forwarded to the merchant for authorization (step 322). The transaction is validated at step 324, payment is approved at step 326, resulting in a happy consumer (step 328).

U.S. patent application Ser. No. 13/835,088 (Nwokolo) generally discloses a system of tokenizing sensitive cardholder payment information for use in cashless transactions. The disclosure of U.S. patent application Ser. No. 13/835,088 in its entirety is hereby incorporated into this specification by way of reference. Tokenization is also described in detail in the document "EMV Payment Tokenisation Specification—Technical Framework" (version 1.0, March 2014) of EMV Co., which is hereby incorporated into this specification for all purposes by reference. The EMV Payment Tokenisation Specification is available at www.emvco.com.

Nwokolo identifies that electronic wallets are becoming a more prevalent counterpart to electronic forms of payment for a wide variety of transactions. Nwokolo puts forward that the system above described in Wong, together with the system being the subject of U.S. patent application Ser. No. 13/746,904 entitled "System and method to enable a network of digital wallets," includes a federated network of electronic wallets. The purchaser may select this network of wallets which includes partners who are members of the federation, each of whom provide electronic wallet services. One option presented to the purchaser may be the option to use an electronic wallet maintained and provided by the payment processing entity, e.g., MasterPass of MasterCard International Incorporated (assignee of the instant application), which is also operating the network of wallets.

Given the overwhelming volume of transactions consummated per second, and the necessity that transactions be authorized expeditiously in order to be acceptable forms of payment for all parties involved in the transaction, the circumstances naturally lend themselves to automation of the approval process. However, without adequate oversight on an individual or per-transaction basis, and/or without the parties to the transaction being known to others involved, including the intermediary, the opportunity for malicious abuse of the payment system require adequate safeguards.

A problem presented is where the transaction details required to consummate a purchaser's transaction may be used thereafter for malicious purposes, for example if the security of such data is compromised by a third party, or by another bad actor with access to cardholder data used during the transaction.

As a solution to this problem, Nwokolo provides the system shown in FIG. 2(a) which generally performs the steps of:
  a) receiving a request to process a cashless transaction between a merchant and a purchaser using first payment data stored with an electronic wallet provider on behalf of the purchaser;
  b) receiving first payment data from the electronic wallet provider;
  c) tokenizing the first payment data into a payment token; and
  d) providing the payment token to the merchant for use in completing the cashless transaction.

The merchant issues a request to process payment for the cashless transaction using the payment token. The payment token is detokenized into second payment data, with correspondence between the first and second payment data being indicative of payment token authenticity. Payment for the cashless transaction is processed using the second payment data, and the merchant is provided with a response indicating either the success or failure of the payment processing.

It is generally desirable to overcome or ameliorate one or more of the above described difficulties, or to at least provide a useful alternative.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

There is provided a method of providing a digital gift card to a beneficiary, the method including, in one or more electronic processing devices:
  a) receiving, from a digital wallet of an individual, a request to create a digital gift card including information indicative of at least one of:
    i) an occasion associated with the digital gift card; and,
    ii) beneficiary information associated with the beneficiary;
  b) determining, based on at least one of the occasion and the beneficiary information, a plurality of gift card offers offered by respective merchants;
  c) presenting to the beneficiary, from the digital wallet, the plurality of gift card offers;
  d) receiving, from the digital wallet, an indication of a selected gift card offer;
  e) processing a payment dependent on the information from the digital wallet to the merchant offering the selected gift card offer; and,
  f) sending a digital gift card notification for the selected gift card offer to the beneficiary, to thereby allow the beneficiary to obtain the digital gift card in a digital wallet of the beneficiary and redeem the digital gift card with the merchant using the digital wallet of the beneficiary.

Preferably, the method includes determining the plurality of gift card offers based on both the occasion and the beneficiary information.

It is preferable that the beneficiary information includes at least one of:
  a) an age group of the beneficiary;
  b) a gender of the beneficiary;
  c) a location of the beneficiary; and,
  d) contact details of the beneficiary.

It is also preferable that the contact details include at least one of:
  a) a mobile telephone number of the beneficiary;
  b) an email address of the beneficiary; and,
  c) a social network account name associated with the beneficiary.

Furthermore, the method can include obtaining the beneficiary information by:
  a) receiving, from the digital wallet, contact details of the beneficiary;
  b) identifying the beneficiary digital wallet of the beneficiary based on the contact details; and,
  c) obtaining the beneficiary information from the beneficiary digital wallet.

The method may include obtaining the beneficiary information by having the individual manually enter the beneficiary information from the digital wallet.

The method may also include:
a) receiving, from the digital wallet, a value/value range for the digital gift card; and,
b) presenting the gift card offers having the received value/values within the received value range.

It is preferable that the method includes obtaining the occasion by:
a) presenting, from the digital wallet, a plurality of occasion options; and,
b) receiving, from the digital wallet, a selection of one of the occasion options.

Preferably, the method includes determining the one or more gift card offers using at least one of:
a) a rule based engine; and,
b) a predictive analysis.

It is preferable that the method includes:
a) using the beneficiary information to access social network information associated with the beneficiary; and,
b) determining the one or more gift card offers based on at least some of the social network information.

The method preferably includes determining the one or more gift card offers by selecting gift card offers offered by participating merchants.

It is preferable that the method includes presenting the gift card offers offered by the one or merchants in an order based on at least one of:
a) whether a merchant is a preferred merchant; and,
b) a degree of relevance to the beneficiary determined based on the beneficiary information.

Preferably, at least one of the gift card offers includes a discount offer in which a payment amount required for the gift card offer is less than a redemption value for the gift card offer.

The method may also include:
a) receiving, from the digital wallet, personalisation options; and
b) generating the digital gift card notification based on the personalisation options.

It is preferable that the method includes:
a) presenting, from the digital wallet, a plurality of gift card templates relevant to the occasion;
b) receiving, from the digital wallet, an indication of a selected gift card template; and,
c) generating the digital gift card notification in accordance with the selected gift card template.

The method may include:
a) receiving, from the digital wallet, a personalised message; and,
b) generating the digital gift card notification including the personalised message.

It is preferable that the method includes generating the digital gift card notification including authentication information for the digital gift card.

Preferably, the method includes obtaining the authentication information by having the individual manually enter the authentication information from the digital wallet.

The method may include, after processing the payment:
a) receiving, from the merchant offering the selected gift card offer, a unique gift card code; and,
b) associating the unique gift card code with the authentication information and at least some of the beneficiary information.

The method may include:
a) receiving, from the digital wallet of the beneficiary:
   i) a request to obtain the digital gift card; and,
   ii) authentication information for the digital gift card;
b) authenticating the digital gift card using the authentication information; and,
c) providing the digital gift card in the digital wallet of the beneficiary.

It is preferable that the method includes, after redeeming the digital gift card, sending a notification to the individual that the beneficiary has redeemed the digital gift card on a particular date and at a particular merchant/location.

There is also provided another method of providing a digital gift card to a beneficiary, the method including, in one or more electronic processing devices:
a) sending a digital gift card notification to the beneficiary including associated authentication information;
b) receiving, from a digital wallet of the beneficiary:
   i) a request for the digital gift card to be provided into the digital wallet; and; ii) authentication information provided by the beneficiary;
c) authenticating the beneficiary using the authentication information received from the beneficiary and the authentication information associated with the digital gift card; and,
d) providing the digital gift card into the digital wallet of the beneficiary in response to successful authentication.

Preferably, the associated authentication information is provided by an individual sending the digital gift card to the beneficiary.

It is preferable that the associated authentication information includes at least one of:
a) a personal identification number (PIN);
b) a password; and,
c) a code.

It is preferable that after receiving the request for the digital gift card to be provided into the digital wallet, the method further includes sending a request to the beneficiary, from the digital wallet, for authentication information to be provided.

Preferably, the digital gift card notification is sent to a mobile device of the beneficiary using a mobile phone number provided by the individual sending the digital gift card.

In addition, after sending the digital gift card notification to the beneficiary, the method may further include receiving a request from the beneficiary to establish a digital wallet account.

The method may further include establishing a digital wallet account for the beneficiary.

There is provided a third method of performing a payment transaction with a merchant using a digital gift card, the method including, in one or more electronic processing devices:
a) receiving, from a digital wallet of a beneficiary containing the digital gift card, a request to perform a payment transaction using the digital gift card;
b) determining that a source of the received payment request is a digital gift card;
c) validating the digital gift card; and,
d) performing the payment transaction using the digital gift card in response to successful validation.

It is preferable that the digital gift card is validated using a unique gift card code associated with the digital gift card.

It is preferable that the step of validating the gift card includes one or more of:
a) locating the unique gift card code in a database containing digital gift card information;

b) determining whether the digital gift card associated with the unique gift card code has expired or been used; and, c) determining whether the digital gift card is redeemable for the goods or services involved in the transaction.

Preferably, the request to perform a payment transaction using the digital gift card is received by a contactless enabled merchant terminal.

The method preferably further includes sending a notification to the beneficiary that the transaction using the digital gift card has been approved.

There is also provided a system for providing a digital gift card to a beneficiary, the system including one or more electronic processing devices configured to:

a) receive, from a digital wallet of an individual, a request to create a digital gift card including information indicative of at least one of:
   i) an occasion associated with the digital gift card; and,
   ii) beneficiary information associated with the beneficiary;

b) determine, based on at least one of the occasion and the beneficiary information, a plurality of gift card offers offered by respective merchants;

c) present, from the digital wallet, the plurality of gift card offers;

d) receive, from the digital wallet, an indication of a selected gift card offer;

e) process a payment from the digital wallet to the merchant offering the selected gift card offer; and, f) send a digital gift card notification for the selected gift card offer to the beneficiary, to thereby allow the beneficiary to obtain the digital gift card in a beneficiary digital wallet of the beneficiary and redeem the digital gift card with the merchant using the beneficiary digital wallet.

There is also provided a second system for providing a digital gift card to a beneficiary, the system including one or more electronic processing devices configured to:

a) send a digital gift card notification to the beneficiary including associated authentication information;

b) receive, from a digital wallet of the beneficiary:
   i) a request for the digital gift card to be provided into the digital wallet; and,
   ii) authentication information provided by the beneficiary;

c) authenticate the beneficiary using the authentication information received from the beneficiary and the authentication information associated with the digital gift card; and, d) provide the digital gift card into the digital wallet of the beneficiary in response to successful authentication.

There is provided a system for performing a payment transaction with a merchant using a digital gift card, the system including one or more electronic processing devices configured to:

a) receive, from a digital wallet of a beneficiary containing the digital gift card, a request to perform a payment transaction using the digital gift card;

b) determine that a source of the received payment request is a digital gift card;

c) validate the digital gift card; and, d) perform the payment transaction using the digital gift card in response to successful validation.

It is preferable that the one or more electronic processing devices include:

a) a user processing system for providing a user interface for the digital wallet; and, b) a server processing system coupled to the user processing system via a communications network.

It is preferable that the one or more electronic processing devices further include a merchant processing system coupled to the server processing system via the communications network.

Preferably, the server processing system is configured to send a notification to the individual that the beneficiary has redeemed the gift card on a particular date and at a particular merchant/location.

It will be appreciated that the broad forms of the invention and their respective features can be used in conjunction, interchangeably and/or independently, and reference to separate broad forms in not intended to be limiting.

BRIEF DESCRIPTION OF THE DRAWINGS

An example of the present invention will now be described with reference to the accompanying drawings, in which.

DETAILED DESCRIPTION

Figure 1:
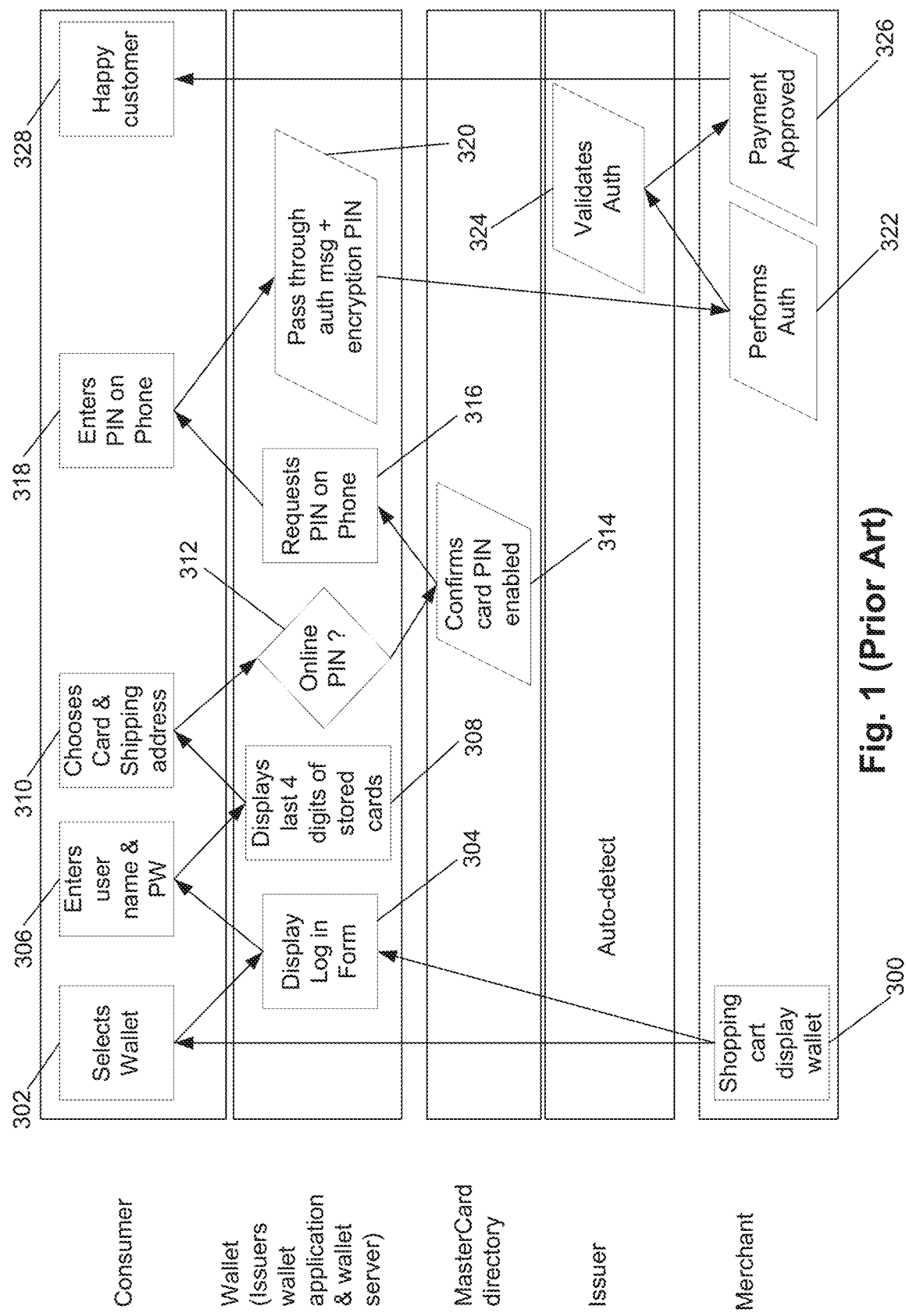
FIG. 1 is a flow chart depicting a prior art wallet application being used in an e-commerce transaction with an online PIN.
Figure 2A:
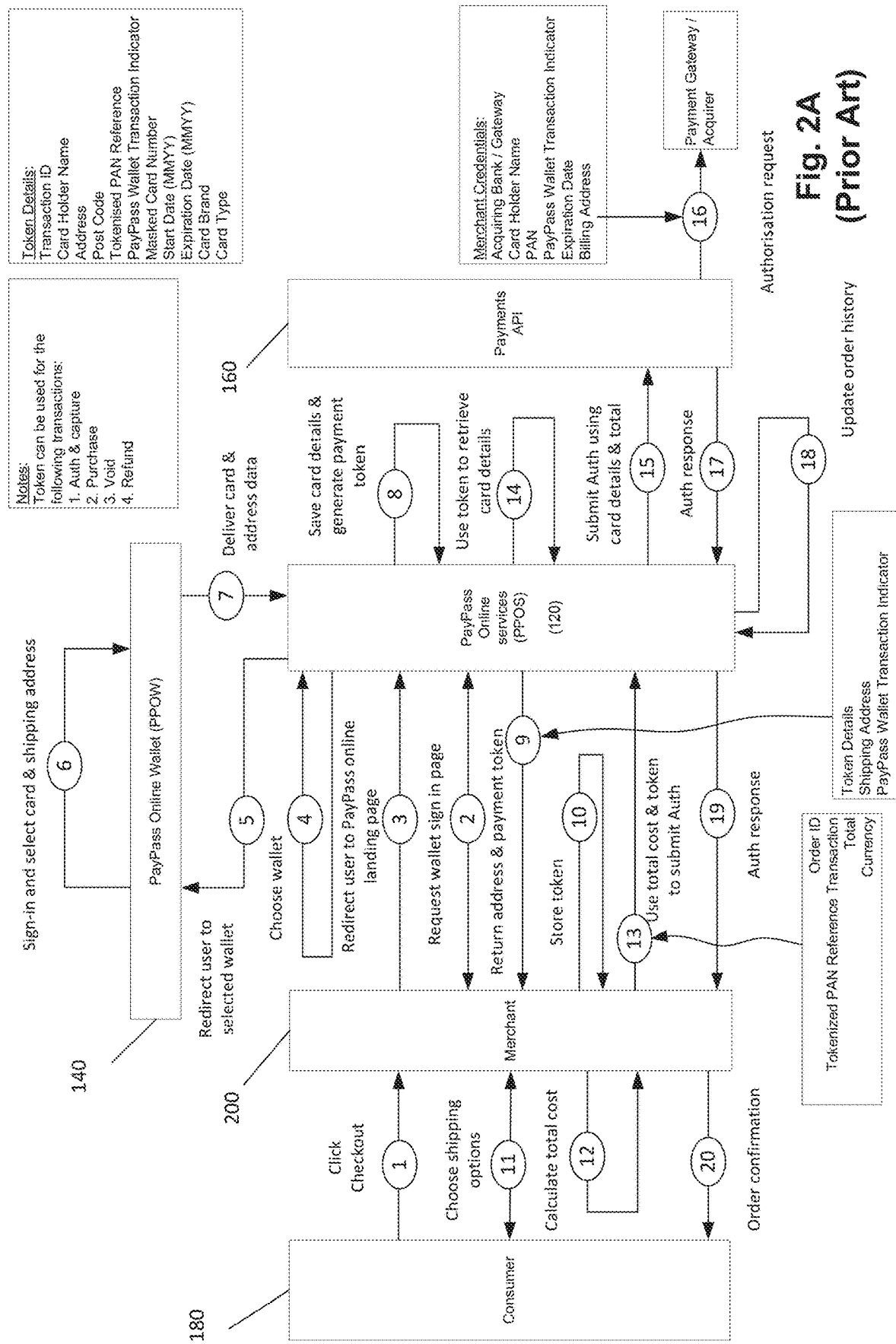
FIGS. 2A and 2B provide schematic representations of prior art payment/authentication systems.
Figure 2B:
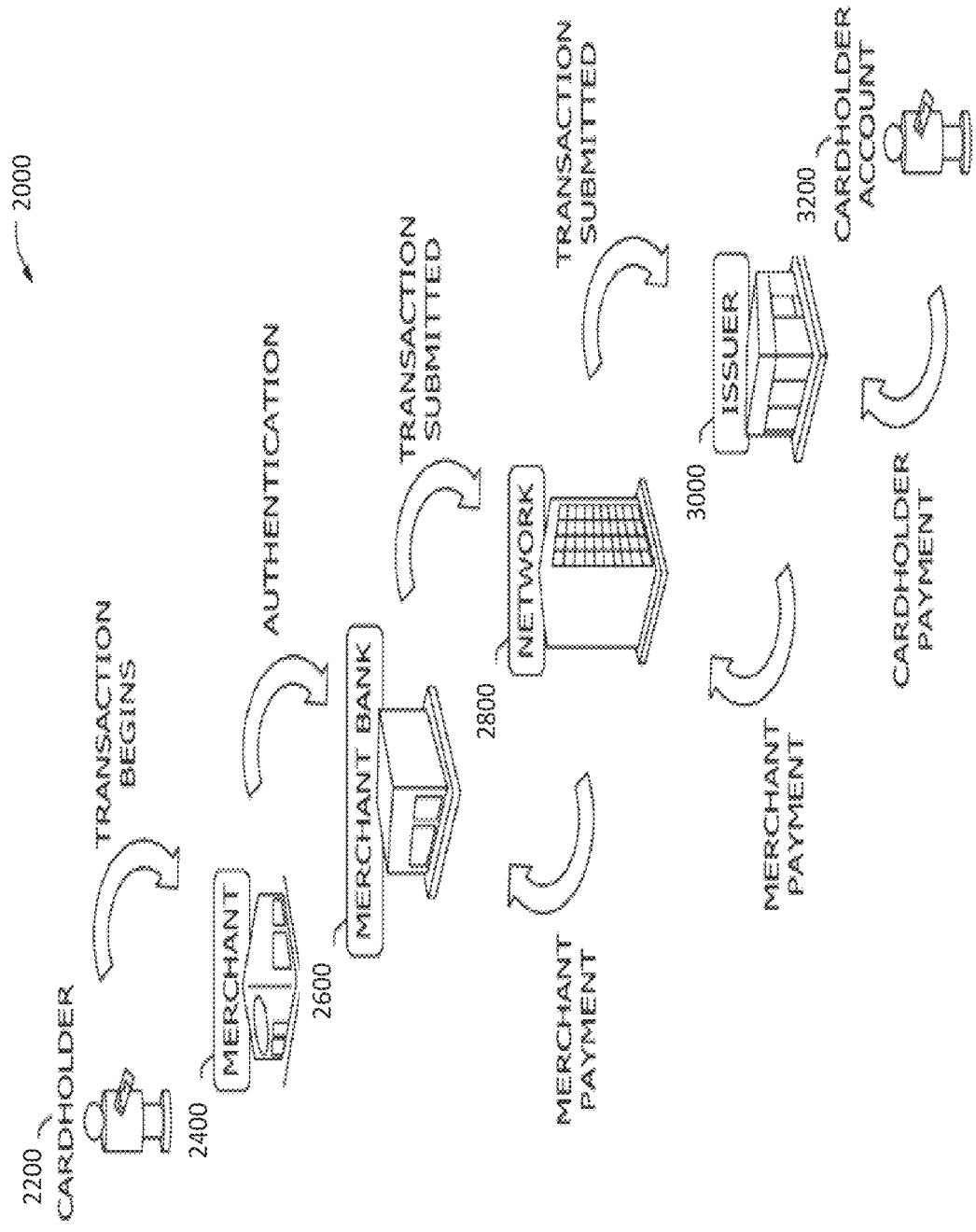

Referring to FIG. 2(b), there is shown a schematic diagram illustrating an example multi-party transaction payment system 2000 for enabling ordinary payment transactions in which merchants 2400 and card issuers 3000 do not need to have a one-to-one special relationship. Embodiments described herein may relate to a transaction system, such as the payment network operated by MasterCard International Incorporated, the assignee of the present disclosure. Such a network is comprised, in part, of a set of proprietary communications standards and protocols for the exchange of financial transaction data and the settlement of funds between financial institutions that are members of the payment network.

In a typical payment system, a financial institution called the "issuer" 3000 issues a payment card, such as a credit card, debit card, electronic check, prepaid card, paper check, mobile phone with access to a payment account, or any other form of payment, to a user 2200, who uses the payment card to tender payment for a purchase from a merchant 2400. To accept payment with the payment card, merchant 2400 must normally establish an account with a financial institution that is part of the financial payment system. This financial institution is usually called the "merchant bank," the "acquiring bank," or the "acquirer." When user 2200 tenders payment for a purchase with a payment card, merchant 2400 requests authorization from a merchant bank 2600 for the amount of the purchase. The request may be performed over the telephone, but is usually performed through the use of a point-of-sale (POS) terminal, which reads user's 2200 account information from a magnetic stripe, a chip, embossed characters, or other device on the payment card that may be manually inputted into the POS terminal, and communicates electronically with the transaction processing computers of merchant bank 2600. Alternatively, merchant bank 2600 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 2800, computers of merchant bank 2600 or merchant processor will communicate with computers of an issuer bank 3000 to determine whether the payment transaction should be authorized. This may include a number of factors such as, whether user's 2200 account 3200 is in good standing, and whether the purchase is covered by user's 2200 available credit line. If the request is accepted, an authorization code is issued to merchant 2400.

When a request for authorization is accepted, the available credit line of user's 2200 account 3200 is decreased. In some cases, a charge for a payment transaction may not be posted, i.e., "captured" immediately to user's 2200 account 3200, whereas in other cases, especially with respect to at least some debit card transactions, a charge may be posted or captured at the time of the transaction. In some cases, when merchant 2400 ships or delivers the goods or services, merchant 2400 captures the transaction by, for example, appropriate data entry procedures on the POS terminal. This may include bundling of approved transactions daily for standard retail purchases. If user 2200 cancels a transaction before it is captured, a "void" is generated. If user 2200 returns goods after the transaction has been captured, a "credit" is generated. Payment network 2800 and/or issuer bank 3000 stores the payment card information, such as a type of merchant, amount of purchase, date of purchase, in a database.

For debit card transactions, when a request for a PIN authorization is approved by the issuer, the consumer's account is decreased. Normally, a charge is posted immediately to a consumer's account. The issuer 3000 then transmits the approval to the merchant bank 2600 via the payment network 2800, with ultimately the merchant 2400 being notified for distribution of goods/services, or information or cash in the case of an ATM.

After a purchase has been made, a clearing process occurs to transfer additional transaction data related to the purchase among the parties to the transaction, such as merchant bank 2600, payment network 2800, and issuer bank 3000. More specifically, during and/or after the clearing process, additional data, such as a time of purchase, a merchant name, a type of merchant, purchase information, user account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when user 2200 purchases travel, such as airfare, a hotel stay, and/or a rental car, at least partial itinerary information is transmitted during the clearance process as transaction data. When payment network 2800 receives the itinerary information, payment network 2800 routes the itinerary information to the database 120.

After a transaction is authorized and cleared, the transaction is settled among merchant 2400, merchant bank 2600, and issuer bank 3000. Settlement refers to the transfer of financial data or funds among merchant's 2400 account, merchant bank 2600, and issuer bank 3000 related to the transaction. Usually, transactions are captured and accumulated into a "batch," which is settled as a group. More specifically, a transaction is typically settled between issuer bank 3000 and payment network 2800, and then between payment network 2800 and merchant bank 2600, and then between merchant bank 2600 and merchant 2400.

Figure 3:
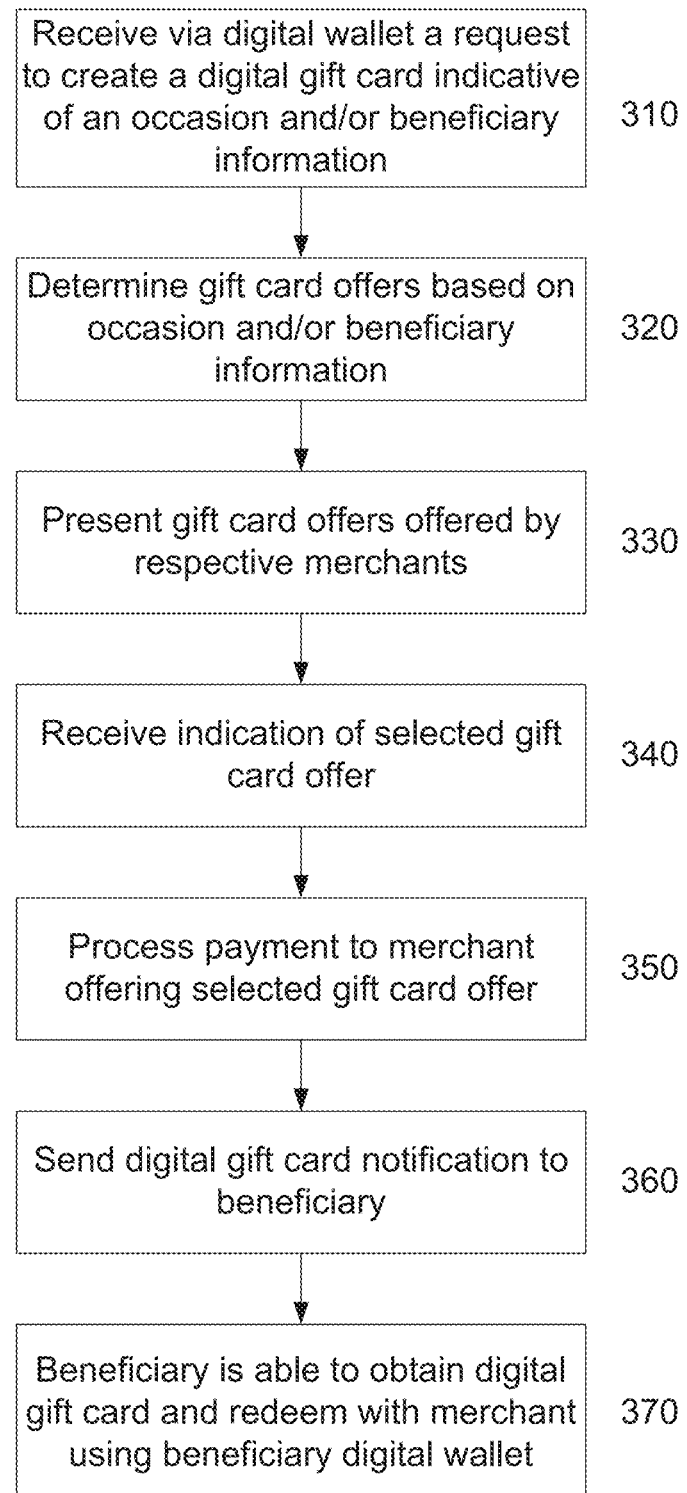
FIG. 3 is a flow chart of an example of a method of providing a digital gift card to a beneficiary.

An example of a method of providing a digital gift card to a beneficiary will now be described with reference to FIG. 3.

The method is performed in one or more electronic processing devices, and suitable examples of electronic processing device arrangements will be described in further detail in due course. In broad terms, the method includes the following steps.

The method commences at step 310, which involves receiving, via a digital wallet of an individual, a request to create a digital gift card. The request includes information indicative of at least one of an occasion associated with the digital gift card and beneficiary information associated with the beneficiary.

The digital wallet will typically be implemented using a user processing system and one or more server processing systems coupled to the user processing device via a communications network. The user processing system is typically used to provide a user interface for allowing the individual to interact with the digital wallet, and may be in the form of a personal computer or mobile device of the individual. The user interface may be provided using application software executed by a processor of the user processing system or using web hosted content accessed in a web browser executed by the processor of the user processing system. The one or more server processing systems are typically used to receive information from the user processing system, process the information and send information to the user processing system or to other electronic processing systems as required. The one or more server processing systems may include a processor for processing the information and a store such as a database for storing received and/or processed information as required.

For the purpose of this example, it is assumed that the digital wallet is implemented using a mobile device of the individual, such as a smartphone or tablet device, with the user interface being provided using dedicated application software which is adapted to communicate with a remotely located server processing system for processing the request to create the digital gift card received at step 300. Thus, the request may be received by having the individual interact with the mobile device, such as by using a touch screen interface or other user inputs/outputs, to thereby initiate the request and provide required information. The request and associated information may then be transferred to the server processing system for further processing. It will be appreciated that the digital wallet may be implemented in alternative environments, such as via a web browser executing on a laptop or desktop computer.

The next step 320 involves, determining, based on at least one of the occasion and the beneficiary information, a plurality of gift card offers offered by respective merchants. This will typically be performed by the server processing system using the received information associated with the request together with information regarding participating merchants and available gift card offers, which may, for instance, be stored in a database of the server processing system, although this information may alternatively be stored in the user processing system.

In some examples, the occasion indicated in the digital gift card request may be used to determine a subset of the participating merchants that are known to offer products or services of relevance to the particular occasion. In other examples, at least some of the beneficiary information indicated in the digital gift card request may be used to determined a subset of the participating merchants that are known to offer products or services of relevance to a particular consumer category or demographic (e.g. age group, gender, location) matching the beneficiary information. The occasion and/or the beneficiary information may also be used to provide a reduced selection of gift card offers if different offers are available that may only be relevant to particular occasions or categories of consumers. It should be appreciated that the gift card offers need not be monetary, and can include, for example, discount codes.

In preferred examples, the determination of the plurality of gift card offers at step 310 may be based on both the occasion and the beneficiary information, in order to provide a set of gift card offers with an improved likelihood of relevance to the occasion and the beneficiary, to thereby allow the individual to make a selection that is more likely to be pleasing to the beneficiary.

After determining the gift card offers, the method includes presenting, via the digital wallet, the plurality of gift card offers at step 330, and subsequently receiving, via the digital wallet, an indication of a selected gift card offer at step 340. The plurality of gift card offers will typically be presented to the individual on a display of the user processing system, such as the touch screen of a smartphone or tablet device. The individual is then able to review the gift card offers and make a selection of a preferred gift card offer that the individual would like to give to the beneficiary, such as by touching an icon representing the gift card offer on the touch screen.

Then, step 340 involves processing a payment from the digital wallet to the merchant offering the selected gift card offer. It will be appreciated that the digital wallet will be already configured for making payments by its very nature, and thus this may use conventional digital wallet payment processing techniques. For example, processing the payment may include having the consumer select a bank account or credit card (or other payment instrument such as a debit card or prepaid card) that is registered with the digital wallet as the preferred source of funds for the payment, and providing authorisation to proceed with the payment on that basis. Authentication information such as a personal identification number (PIN), password, biometric information (such as a fingerprint scan or face scan captured by the user processing system) or the like may also need to be provided by the individual to allow the payment to proceed. It will be appreciated that such authentication may have already been provided to access the digital wallet in the first place and may not be required again to enable the actual payment.

In any event, once authorisation and any required authentication has been provided by the individual, the payment may be facilitated by the server processing system. The specifics of the payment transaction will depend on the particular configuration of the digital wallet. In some implementations, the server processing system associated with the digital wallet may be operated by a financial institution that provides its own payment gateway which is capable of debiting the required funds from the selected bank account or credit card of the individual and crediting the funds to an account of the merchant offering the selected gift offer. In other implementations, the server processing system may communicate with a separate payment gateway offered by a third party to facilitate the transaction.

Once the payment has been processed, the merchant may enter details of the digital gift card into a local gift card database or the like and share a unique code associated with the digital gift card with the server processing system to allow the digital gift card to be redeemed by the beneficiary at a later stage. Once the beneficiary redeems the digital gift card, the server processing system can send a notification to the individual (sender) that the beneficiary has redeemed the gift card on a particular date and at a particular merchant/location. Further details of examples illustrating such procedures will be described in due course.

In any event, after the respective merchant has been paid for the selected gift card offer, the next step 360 involves sending a digital gift card notification for the selected gift card offer to the beneficiary. For instance, the digital gift card notification may be sent as an email to the beneficiary using an email address provided with the beneficiary information, or alternatively, may be sent to a mobile device as a Short Message Service (SMS) or Multimedia Message Service (MMS) message, or the like. The step of sending the digital gift card notification will typically be handled by the server processing system.

The email or message received by the beneficiary may be self-contained and provide a personalised digital gift card notification including all relevant information for allowing the beneficiary to obtain and subsequently receive the digital gift card. Alternatively, the email or message may provide a Uniform Resource Locator (URL) to allow the beneficiary to access the personalised digital gift card notification in a web browser along with further information as needed. Thus, the digital gift card notification to be used to allow the beneficiary to access additional information without being constrained by limitations of email of messaging protocols.

As indicated at step 370, once the beneficiary has been sent the digital gift card notification, this will allow the beneficiary to obtain the digital gift card in a beneficiary digital wallet of the beneficiary and redeem the digital gift card with the merchant using the beneficiary digital wallet. This may occur at a later stage and specific steps involved in obtaining and redeeming the digital gift card will be described in separate examples to follow. It will be appreciated that the beneficiary digital wallet may be implemented in a similar manner as discussed above for the digital wallet of the individual.

The digital gift card notification sent to the beneficiary and the digital gift card that can be obtained by the beneficiary will preferably be personalised by the individual, such as to reflect the particular occasion and/or to include a personalised message prepared by the individual. Examples of potential personalisation options will also be discussed in further detail below.

In any event, it will be appreciated that the above described method of providing a digital gift card to a beneficiary, provides a useful value add feature for digital wallets. The method provides a replacement for cash gifts which are traditionally used on special occasions like weddings, birthdays, anniversaries, house warming ceremonies, festivals, birth of a child, or the like. Thus, an individual can conveniently create, personalise and send a digital gift card to a beneficiary without suffering the typical downsides of conventional physical gift cards or cash. By providing a digital gift card, an individual can avoid the need for the individual to withdraw cash and the associated risk of loss or theft, or avoid the need to physically attend a merchant's premises to purchase a physical gift card or await postage thereof.

The option to create a digital gift card may be integrated into an existing digital wallet interface, thereby facilitating streamlined payment to the merchant for the digital gift card. Similarly, the option for the obtaining a digital gift card may be integrated into the digital wallet interface, to allow a beneficiary to have the digital gift card added to their other accounts and/or cards registered with the beneficiary digital wallet and thus facilitate seamless redemption of the digital gift in a familiar manner consistent with other payments using the digital wallet.

Furthermore, it should be noted that the beneficiary does not necessarily need to have a digital wallet to be sent the digital gift card notification, but will ultimately need to have a digital wallet to actually obtain and redeem the digital gift card. As will be discussed in further detail below, the beneficiary may establish a new digital wallet to take advantage of a received digital gift card. It will therefore be appreciated that by implementing a capability to provide digital gift cards to beneficiaries without limitation to the current digital wallet user base, the operator of a digital wallet platform may promote expansion of the digital wallet user base as digital gift cards are provided to new beneficiaries, whom will in turn be converted into new digital wallet users.

The above method also provides advantages to participating merchants by providing a capability for merchants to promote their gift card offers to digital wallet users. Furthermore, merchants may choose to provide special discount offers to encourage selection of their gift card offers, or to tailor their gift card offers to particular occasions.

Further optional implementation features of the method will now be described.

As discussed above, the information accompanying the request to create a digital gift card may include an occasion, and this may be selected from list of pre-configured occasions presented to the individual via the digital wallet. For example, the list of occasions for selection may be presented in the digital wallet user interface displayed on the user processing system of the individual. Thus, the method may include obtaining the occasion by presenting, via the digital wallet, a plurality of occasion options, and receiving, via the digital wallet, a selection of one of the occasion options. In one example, the occasions may be displayed on a touch screen of a smartphone or tablet device and the individual may touch the desired occasion to make the selection.

As also discussed above, the information accompanying the request to create the digital gift card may also include beneficiary information associated with the beneficiary. The beneficiary information may be used instead of or together with the occasion in determining the plurality of gift card offers. However, in preferred examples, determining the plurality of gift card offers may be based on both the occasion and the beneficiary information.

The beneficiary information may include any details that may be useful in allowing relevant gift card offers to be selected, such as based on a demographic or consumer category of the beneficiary. For example, the beneficiary information may include an age group of the beneficiary, a gender of the beneficiary or a location of the beneficiary. Additionally or alternatively, the beneficiary information may include contact details of the beneficiary, such as a mobile telephone number or an email address of the beneficiary, a social network account name associated with the beneficiary, or the like. The contact details may be input manually by the individual or may be selected from an existing contact list, such as a smartphone contact list of the individual.

In one example, the beneficiary information may be obtained by only requiring the contact details of the beneficiary to be supplied by the individual, provided the beneficiary already has a digital wallet. The contact details may be received via the digital wallet, and then the beneficiary digital wallet may be identified based on the contact details, such that beneficiary information may be obtained from the beneficiary digital wallet. This may involve accessing stored personal information of the beneficiary that may be associated with the beneficiary digital wallet in a database or the like.

Alternatively, the beneficiary information may be obtained by having the individual manually enter the beneficiary information via the digital wallet. For example, the individual may enter the age, gender and location of the beneficiary by making selections from lists of respective options or by manually inputting information using the digital wallet user interface.

The method will typically also include having the individual establish a desired value for the digital gift card. This may be done as part of the request, in which case the method may include receiving, via the digital wallet, a value or a value range for the digital gift card, and presenting the gift card options having values in accordance with the received value or value range. Alternatively, the gift card offers may be initially presented without limitation to a particular value, and the individual may select a gift card offer and input the desired value for the selected gift card offer.

In some examples, the method may include determining the one or more gift card offers using a rule based engine or a predictive analysis based on the occasion and/or the beneficiary information. In one example, the one or more server processing systems that receive and process the information to determine the gift card offers may implement a real time decision engine, which is configured to decide on the most relevant gift card offers for a particular occasion and/or particular beneficiary information. For instance, the real time decision engine may be configured to follow a rule based approach to determine which merchants are most likely to offer relevant gifts and services and prioritise gift card offers from those merchants in the determination of the gift card offers.

The method may also include taking account of additional information associated with the beneficiary in the determination of the gift card offers to be presented for selection. For example, the method may involve using the beneficiary information to access social network information associated with the beneficiary, and then determining the one or more merchants based on at least some of the social network information. The social network information may include particular interests or "likes" indicated in a social network profile of the beneficiary, or particular companies that the beneficiary follows or has included in a social media feed, in which case the companies may directly correspond to merchants offering gift card offers or may be indicative of other merchants which may offer goods and services that may be desirable to the beneficiary.

Typically, the method will include determining the one or more merchants by selecting from a plurality of participating merchants. Details of gift card offers may be provided by the participating merchants for use, and payment details for participating merchants may be stored to enable streamlined payment upon selection of a gift card offer associated with a particular participating merchant.

In some examples, the gift card options offered by the one or merchants may be presented in an order based on different factors, such as whether a merchant is a preferred merchant or a determined degree of relevance to the beneficiary based on the beneficiary information. A participating merchant may become a preferred merchant through a variety of different mechanisms. For example, the preferred merchant status may be obtained through payment to the operator of the digital wallet system or may be obtained when the merchant achieves a predetermined level of digital gift card sales, which will be indicative of the merchant's popularity with users.

In some implementations, at least some of the gift card offers may include a discount offer in which a payment amount required for the gift card offer is less than a redemption value for the gift card offer. For example, if an individual is seeking to give a digital gift card with a value of $50, a discount offer may be provided for one of the gift card offers which allows the individual to purchase the digital gift card for a reduced amount, such as $45. This can provide a mechanism for merchants to compete for the attention of an individual selecting from a range of gift card options through discounting.

As discussed above, the digital gift card notification that is sent to the beneficiary may be personalised by the individual. Thus, the method may include receiving, via the digital wallet, personalisation options, and generating the digital gift card notification based on the personalisation options. In some examples, a plurality of gift card templates relevant to the occasion may be presented via the digital wallet for selection by the individual, after which an indication of a selected gift card template is received and the digital gift card notification may subsequently be generated in accordance with the selected gift card template. The digital gift card that is ultimately obtained by the beneficiary in the beneficiary digital wallet may also be personalised in accordance with the selected gift card template.

The individual may also be provided with an opportunity to input a personalised message to be sent to the beneficiary with the digital gift card notification. Accordingly, in some examples, the method may include receiving, via the digital wallet, a personalised message and generating the digital gift card notification including the personalised message.

In some examples, the method may be implemented to include measures for authenticating the recipient of the digital gift card. For instance, the method may include generating the digital gift card notification including authentication information for the digital gift card. The authentication information may include a security code such as a Personal Identification Number (PIN) that is required to be entered into the beneficiary digital wallet to allow the digital gift card to be obtained and redeemed by the beneficiary.

In one example, the method may include obtaining the authentication information by having the individual manually enter the authentication information, via the digital wallet. For instance, the individual may enter a PIN or other passcode which is sent to the beneficiary along with the digital gift card notification. Then when the beneficiary attempts to obtain the digital gift card using the beneficiary digital wallet, the beneficiary may be prompted to input the PIN via the beneficiary digital wallet, which is sent to the server processing system for authenticating the beneficiary and allowing the digital gift card to be provided to the beneficiary digital wallet. The PIN may be used to access stored information regarding the digital gift card which may include the contact details originally used to send the digital gift card notification to the beneficiary. Those contact details can be cross-checked against the contact details associated with the beneficiary digital wallet to confirm that the beneficiary digital wallet belongs to the beneficiary to whom the digital gift card notification was sent.

The digital gift card may be associated with a unique gift card code for allowing the merchant to process payments by the beneficiary using the digital gift card. In one example, the method may further include receiving, from the merchant offering the selected gift card offer, a unique gift card code, and associating the unique gift card code with the authentication information and at least some of the beneficiary information. The association may be provided in a database of the server processing system, and may be used in the authentication process discussed above.

When a beneficiary has received the digital gift card notification and wishes to obtain the digital gift card, the method of obtaining the digital gift card may involve steps of receiving, via the beneficiary digital wallet, a request to obtain the digital gift card and the authentication information for the digital gift card (received with the digital gift card notification), then authenticating the digital gift card using the authentication information and providing the digital gift card in the beneficiary digital wallet.

Figure 4:
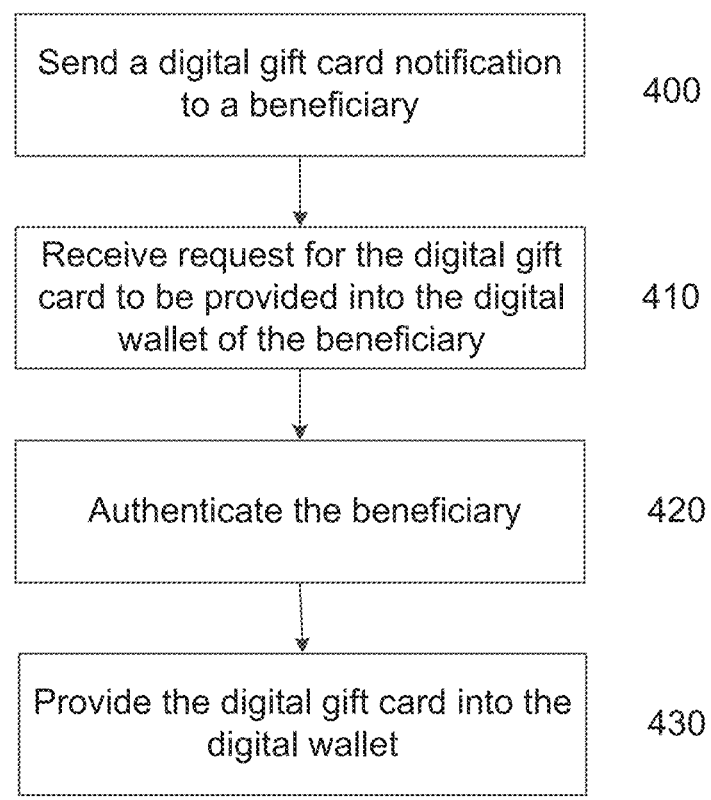
FIG. 4 is a flow chart of a further example of a method of providing a digital gift card to a beneficiary.

A further example of a method of providing a digital gift card to a beneficiary will now be described with reference to FIG. 4.

In this example, at step 400 the processing device sends a digital gift card notification to the beneficiary including associated authentication information. The notification alerts the beneficiary that a digital gift card has been received. The notification will typically include a personalised message from the individual sending the digital gift card, for example 'Happy Birthday Nick' along with details of the digital gift card such as the name of the merchant and value of the gift card. Typically, the notification is sent to a user device of the beneficiary such as a smart phone, tablet, hand-held PC and like mobile devices.

The notification is sent to the user device of the beneficiary which is typically a mobile phone via a communications network, typically a cellular network including for example GSM, GPRS or any other suitable technology using a mobile phone number provided by the individual sending the digital gift card. In one example the notification is sent by a text message although this is not essential and the notification could be delivered in any suitable way, for example by an automated call using text to speech conversion or via email.

The notification also includes authentication information associated with the digital gift card such as a personalised identification number (PIN) or password that in one example is created by the individual that is sending the digital gift card to the beneficiary. As will be described below, the authentication information is used to authenticate the beneficiary to ensure at least that the person to whom the PIN is sent is the owner of the mobile phone number that was provided by the individual.

At step 410, the processing device receives a request to download the digital gift card into a beneficiary digital wallet. The request is typically initiated by the beneficiary by opening their digital wallet (upon receiving the notification) on their mobile device and selecting an option to download the digital gift card. In one example, the beneficiary may be presented with a download icon in a graphical user interface (GUI) of the digital wallet which they can touch to initiate the download process. Upon receiving the request, the beneficiary is prompted to enter the authentication information that was provided to them in the notification sent to their mobile device. The beneficiary enters the authentication information in the digital wallet which is then sent back to the processing device from the digital wallet for authentication.

At step 420, the processing device authenticates the beneficiary using the authentication information provided by the beneficiary and the authentication information associated with the digital gift card. For example, each digital gift card created may have an associated PIN and mobile phone number of the beneficiary. If the PIN received from the beneficiary matches the PIN associated with the digital gift card and the mobile phone number associated with the beneficiary digital wallet from which the PIN was received also matches the mobile phone number associate with the digital gift card, then the beneficiary is authenticated. In other words, another user having a digital wallet (other than the beneficiary) would not be able to download the digital gift card, as they would not know the PIN or even if they determined a valid PIN, they would not have a digital wallet account linked to the correct mobile phone number associated with the digital gift card.

After successful authentication, at step 430, the processing device provides the digital gift card into the digital wallet of the beneficiary. Typically, the digital gift card (including a unique code generated by the merchant) is downloaded into the digital wallet of the beneficiary ready for use in performing a payment transaction with the merchant.

Accordingly the above described method provides a convenient and secure way for a beneficiary to receive a digital gift card which can replace cash which has traditionally been used as a gift for various occasions including weddings, birthdays, anniversaries, births, festivals etc. The above described method enabling a digital gift card to be provided into a digital wallet of a beneficiary is a value added feature for digital wallets enabling further means of payment at selected merchants other than just cash and bank cards.

The beneficiary authentication ensures a level of security in the process to reduce the risk of someone other than the intended beneficiary being able to download the digital gift card. It is also envisaged that this method will assist the providers of such digital wallets reaching new markets and customers as a beneficiary without a digital wallet would be invited to create a digital wallet account in order to receive their digital gift card.

A number of further features will now be described.

In one example, the associated authentication information is provided by an individual sending the digital gift card to the beneficiary. When creating the digital gift card, the individual may be prompted to provide authentication information such as a PIN, password or other unique code before purchasing the digital gift card to send to the beneficiary. After the authentication information has been provided by the individual, it becomes associated with the digital gift card for later use in authenticating the beneficiary. Although typically the individual will provide the authentication information associated with the digital gift card, this is not essential and in other examples, the processing device may generate the authentication information such as a one-time password (OTP) that is sent to the beneficiary.

Typically, the digital gift card notification is sent to a mobile device of the beneficiary such as a smart phone using a mobile phone number provided by the individual sending the digital gift card. The notification may be received by text message, voice message or any other convenient way. In another example, the notification may be sent by email to an email address of the beneficiary provided by the individual when creating the digital gift card.

After receiving the request for the digital gift card to be provided into the digital wallet of the beneficiary, the method further includes sending a request to the beneficiary, via the digital wallet, for authentication information to be provided. Typically, a prompt will appear in the digital wallet of the beneficiary requesting that the authentication information (such as a security PIN) be entered. The beneficiary can then enter the PIN or other authentication information provided to them in the notification message advising them that a digital gift card has been received. The system then authenticates the beneficiary using the authentication information received from the beneficiary and the authentication information associated with the digital gift card.

In one example, the beneficiary receiving a digital gift card notification may not already have a digital wallet. In this case, the notification may include a prompt to download a digital wallet application onto their mobile device or otherwise create a new digital wallet account to enable them to be able to download the digital gift card. In this way, after sending the digital gift card notification to the beneficiary, the method may further include receiving a request from the beneficiary to establish a digital wallet account. The processing device may then guide the beneficiary through the process of establishing a new digital wallet account to enable them to provision their digital gift card into a digital wallet and be able to redeem their digital gift card with a merchant. Accordingly, by providing digital gift cards in digital wallets, the method may encourage more people to start using digital wallets to be able to redeem their gifts. Digital wallet providers are therefore able to grow their customer base along with merchants participating in the system by offering digital gift cards.

Figure 5:
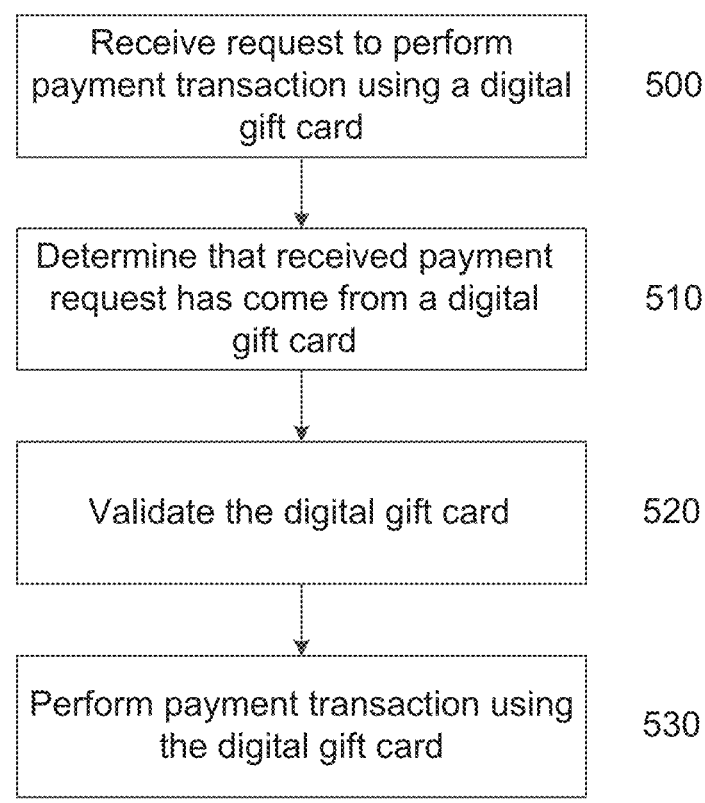
FIG. 5 is a flowchart of an example of a method of performing a payment transaction with a merchant using a digital gift card.

An example of a method of performing a payment transaction with a merchant using a digital gift card will now be described with reference to FIG. 5.

In this example, at step 500, a merchant processing device receives, via a digital wallet of a beneficiary containing the digital gift card, a request to perform a payment transaction using the digital gift card. This can be achieved in at least two distinct ways. In one example, the beneficiary may wish to redeem the digital gift card in a physical merchant store. The beneficiary would present at the counter of the store to purchase a product or service as they normally would paying by cash or card. The beneficiary would open their digital wallet on their user device such as a smart phone, select a gift card option for payment and select the appropriate digital gift card. The beneficiary would then tap their user device against a contactless enabled merchant terminal which is configured to allow communication with the digital wallet. For example, near field communication (NFC) may be used to transfer information between the digital wallet and payment terminal, although any other suitable contactless payment processing technique may be used which is capable of transferring the unique gift card code to the payment terminal.

Alternatively, the beneficiary may be shopping on a merchant website or the like which allows e-commerce transactions to be performed. In this example, the beneficiary may select payment using their digital wallet and be directed to an interface providing their digital wallet. The digital gift card may then be selected as the means for performing the payment transaction with the merchant.

At step 510, the merchant processing device determines that the payment request has come from a digital gift card. For example, the unique gift card code may be sent to the processing device which is able to determine that a digital gift card has been presented for payment, which enables the processing device to process the payment request accordingly.

To process the payment, the merchant processing device firstly validates the digital gift card at step 520. Having determined that the payment request has come from a digital gift card using the unique gift card code associated with the digital gift card, the processing device then uses the unique gift card code to validate the digital gift card. In one example, the processing device sends a query to a merchant application, for example including a database containing digital gift card information. The database can be queried to find the unique gift card code that has been presented by the beneficiary. If the unique gift card code is found in the database, other associated information such as an expiry date of the gift card may be checked to determine whether the digital gift card is valid.

At step 530, the method includes performing the payment transaction using the digital gift card in response to successful validation. The payment transaction may be conducted using any suitable payment processing technique known in the art for handling gift card transactions. If the purchase amounts to less than the value assigned to the digital gift card, then the value of the card may be updated in both the merchant database and the digital wallet of the beneficiary.

The above described method provides a simple and convenient way for a beneficiary of a digital gift card to redeem their gift card with a merchant to perform a payment transaction. A particular benefit of the method in one example is in enabling a beneficiary to present their mobile device to a contactless payment terminal to execute payment with a merchant using a digital gift card in a digital wallet.

A number of further features will now be described.

Typically, the digital gift card is validated using a unique gift card code associated with the digital gift card. This is a unique code generated by the merchant when the digital gift card is created. The unique gift card code may be associated with the digital gift card along with other gift card information such an expiry date or particular products and services that may be purchased with the gift card. In one example, only the unique gift card code is used to validate the digital gift card by matching the presented unique gift card code with a unique gift card code saved in the merchant database.

In addition to locating the unique gift card code in the merchant database, the validation process may also include determining whether the digital gift card associated with the unique gift card code has expired or been used or whether it is redeemable for the goods or services involved in the transaction.

As previously described, in one example, the request to perform a payment transaction using the digital gift card is received by a contactless enabled merchant terminal. This method of requesting payment using a digital gift card is simple as a beneficiary simply opens their digital wallet on their mobile device, selects a gift card payment option and then taps the mobile device against the contactless payment terminal.

After the digital gift card has been validated and the payment processed, a notification may be sent to the beneficiary to advise that the transaction using the digital gift card has been approved.

Figure 6:
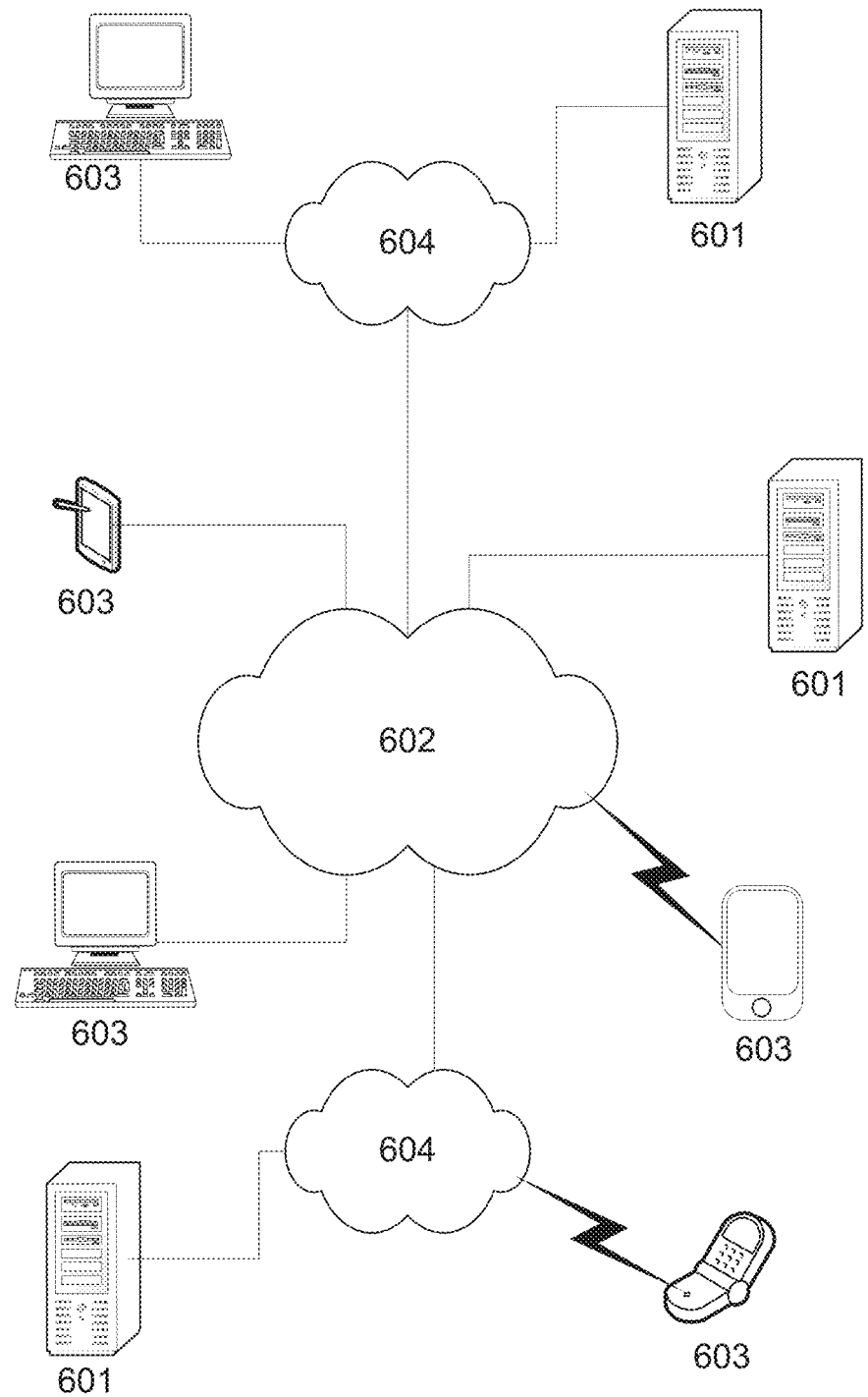
FIG. 6 is a schematic diagram of an example of a distributed computer architecture.

In one example, the above described methods are performed by one or more processing systems operating as part of a distributed architecture, an example of which will now be described with reference to FIG. 6.

In this example, the arrangement includes a number of processing systems 601, 603 interconnected via one or more communications networks, such as the Internet 602, and/or a number of local area networks (LANs) 604. It will be appreciated that the configuration of the networks 602, 604 are for the purpose of example only, and in practice the processing systems 601, 603 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

The nature of the processing systems 601, 603 and their functionality will vary depending on their particular requirements. In one particular example, the processing systems 601, 603 represent servers and clients, although this is not essential and is used primarily for the purpose of illustration.

Figure 7:
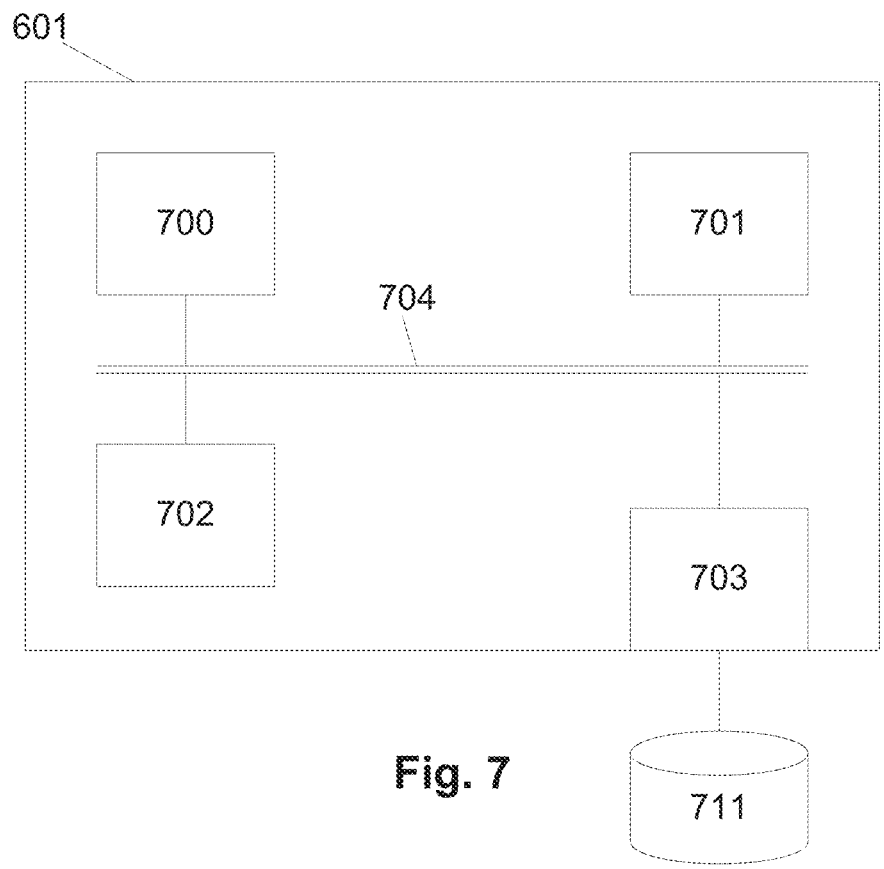
FIG. 7 is a schematic diagram of an example of a server processing system.

An example of a suitable processing system 601 is shown in FIG. 7. In this example, the processing system 601 includes an electronic processing device, such as at least one microprocessor 700, a memory 701, an optional input/output device 702, such as a keyboard and/or display, and an external interface 703, interconnected via a bus 704 as shown. In this example the external interface 703 can be utilised for connecting the processing system 601 to peripheral devices, such as the communications networks 602, 604, databases 711, other storage devices, or the like. Although a single external interface 703 is shown, this is for the purpose of example only, and in practice multiple interfaces using various methods (e.g. Ethernet, serial, USB, wireless or the like) may be provided.

In use, the microprocessor 700 executes instructions in the form of applications software stored in the memory 701 to perform required processes, such as communicating with other processing systems 601, 603. Thus, actions performed by a processing system 601 are performed by the processor 700 in accordance with instructions stored as applications software in the memory 701 and/or input commands received via the I/O device 702, or commands received from other processing systems 601, 603. The applications software may include one or more software modules, and may be executed in a suitable execution environment, such as an operating system environment, or the like.

Accordingly, it will be appreciated that the processing systems 601 may be formed from any suitable processing system, such as a suitably programmed computer system, PC, web server, network server, or the like. In one particular example, the processing system 601 is a standard processing system such as a 32-bit or 64-bit Intel Architecture based processing system, which executes software applications stored on non-volatile (e.g., hard disk) storage, although this is not essential. However, it will also be understood that the processing systems 601 could be or could include any electronic processing device such as a microprocessor, microchip processor, logic gate configuration, firmware optionally associated with implementing logic such as an FPGA (Field Programmable Gate Array), or any other electronic device, system or arrangement.

Figure 8:
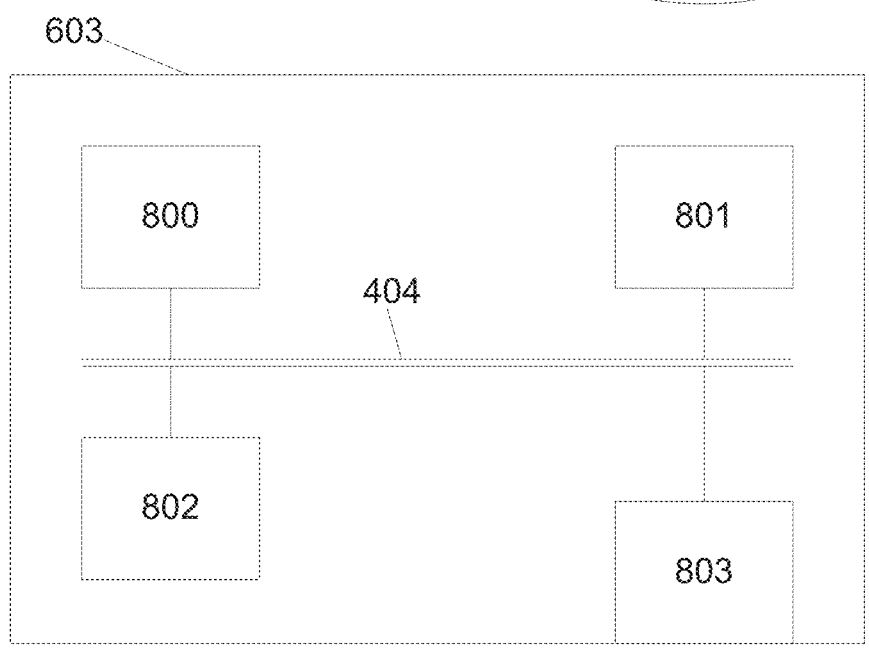
FIG. 8 is a schematic diagram of an example of a user processing system.

As shown in FIG. 8, in one example, the processing systems 603 include an electronic processing device, such as at least one microprocessor 800, a memory 801, an input/output device 802, such as a keyboard and/or display, and an external interface 803, interconnected via a bus 804 as shown. In this example the external interface 803 can be utilised for connecting the processing system 603 to peripheral devices, such as the communications networks 602, 604, databases, other storage devices, or the like. Although a single external interface 803 is shown, this is for the purpose of example only, and in practice multiple interfaces using various methods (e.g. Ethernet, serial, USB, wireless or the like) may be provided.

In use, the microprocessor 800 executes instructions in the form of applications software stored in the memory 801 to perform required processes, for example to allow communication with other processing systems 601, 603. Thus, actions performed by a processing system 603 are performed by the processor 801 in accordance with instructions stored as applications software in the memory 802 and/or input commands received from a user via the I/O device 803. The applications software may include one or more software modules, and may be executed in a suitable execution environment, such as an operating system environment, or the like.

Accordingly, it will be appreciated that the processing systems 603 may be formed from any suitable processing system, such as a suitably programmed PC, Internet terminal, lap-top, hand-held PC, smart phone, PDA, tablet, or the like. Thus, in one example, the processing system 603 is a standard processing system such as a 32-bit or 64-bit Intel Architecture based processing system, which executes software applications stored on non-volatile (e.g., hard disk) storage, although this is not essential. However, it will also be understood that the processing systems 603 can be any electronic processing device such as a microprocessor, microchip processor, logic gate configuration, firmware optionally associated with implementing logic such as an FPGA (Field Programmable Gate Array), or any other electronic device, system or arrangement.

It will also be noted that whilst the processing systems 601, 603 are shown as single entities, it will be appreciated that this is not essential, and instead one or more of the processing systems 601, 603 can be distributed over geographically separate locations, for example by using processing systems provided as part of a cloud based environment.

Examples of the above described methods will now be described in further detail. For the purpose of these examples, it is assumed that the process is administered by one or more of the processing systems 601, acting as server processing systems. Interaction by an individual requesting a digital gift card or a beneficiary obtaining or redeeming a digital gift card is via a user processing system 603, whilst merchants may also have their own processing systems 601/603 for interacting with the server processing system 601 and/or providing additional functionality, such as facilitating contactless payment by a beneficiary using the digital gift card by interacting with a user processing system 603.

For the purpose of this example, it is assumed that the server processing system 601 communicates with application software executed on the user processing systems 603 to implement the digital wallet platform and particularly facilitate the processes associated with the digital gift cards. The server processing system 601 will typically maintain a store of information for each digital wallet user including user information, details of registered bank accounts, credit cards or the like, along with details of any digital gift cards in the digital wallet. It will also be assumed that each user (i.e. the individual requesting the digital gift card or the beneficiary) interacts with server processing system 601 via a GUI (Graphical User Interface), or the like, presented on the user processing system 603, and in one particular example via the application software executed on the user processing systems 603, or alternatively. In another example, users may interact with the server processing system 601 via a browser application that displays webpages hosted by the event server 601.

However, it will be appreciated that the above described configuration assumed for the purpose of the following examples is not essential, and numerous other configurations may be used. It will also be appreciated that the partitioning of functionality between the processing systems 601, 603 may vary, depending on the particular implementation.

Figure 9A:
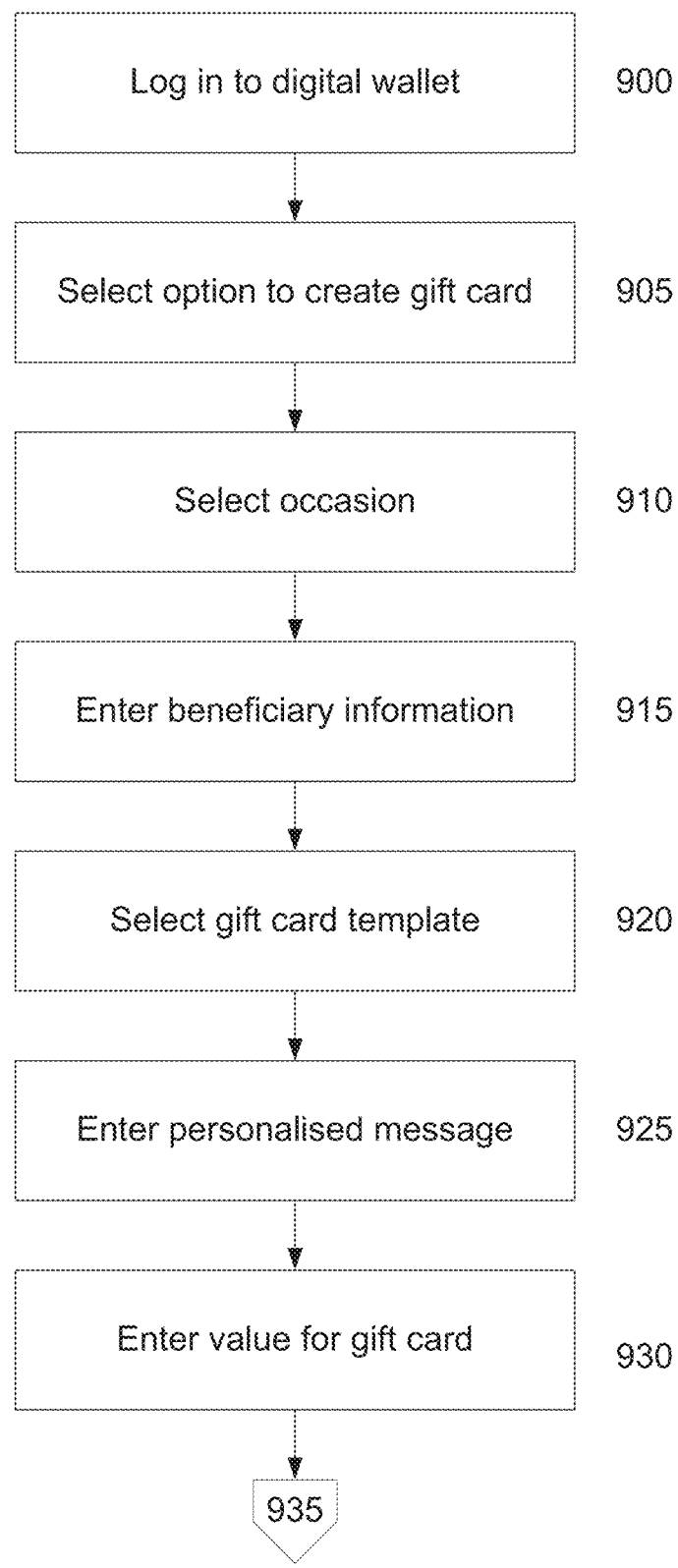
FIGS. 9A to 9C provide a flow chart of an example of a method of creating a digital gift card.
Figure 9B:
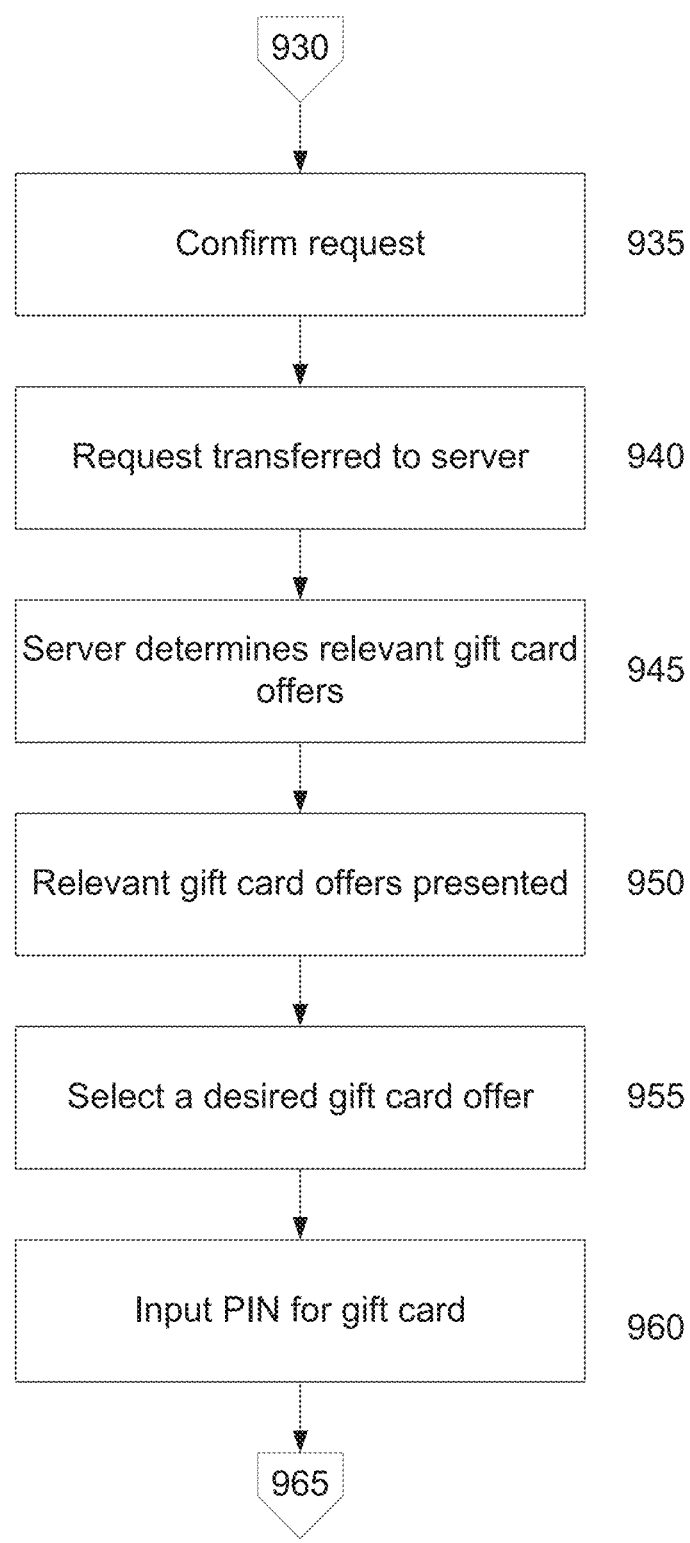
Figure 9C:
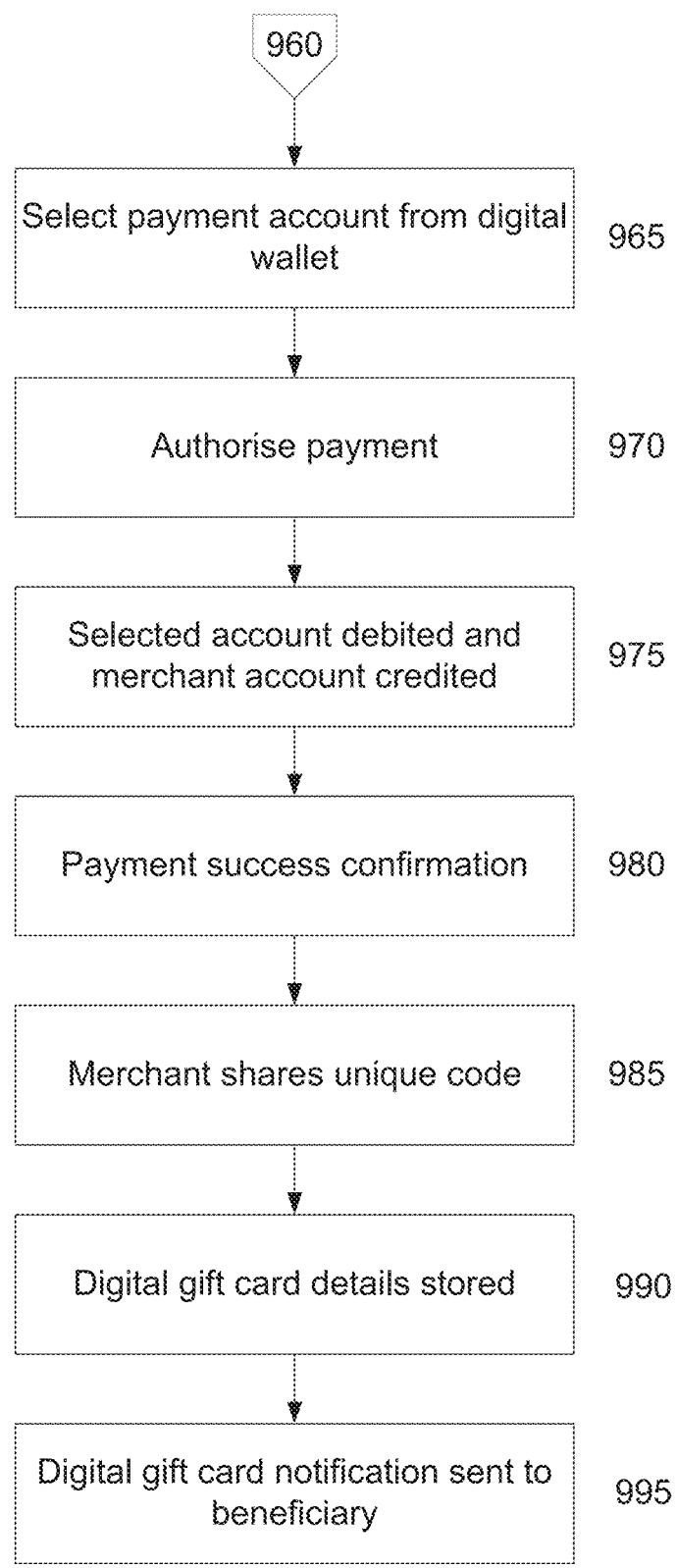

An example of a specific implementation of the above described method of providing a digital gift card to a beneficiary will now be described with reference to FIGS. 9A to 9C.

In step 900, an individual wishing to provide a digital gift card logs in to his/her digital wallet, using a mobile device of the individual in this example. The login process may include entering a username and digital wallet authentication information such as a password or PIN, and/or biometric data such as by scanning a fingerprint or the like.

Figure 12:
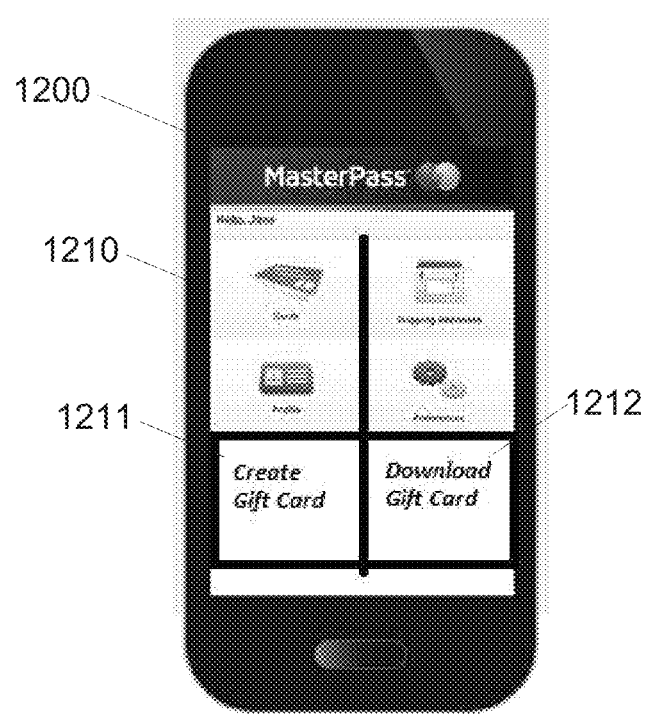

Once logged in, the user may be presented with a digital wallet options screen on the mobile device such as the example shown in FIG. 12. With regard to FIG. 12, the mobile device 1200 displays a digital wallet graphical user interface 1210 upon which a number of options are presented to the user, including an option to create a gift card 1211 and an option to download a gift card 1212.

At step 905, the individual selects the option to create a gift card 1211. The individual is then presented with a list of pre-configured occasions for selection in the digital wallet. For example, the list of occasions may include: Anniversary, Wedding, Birthday, Promotion, Birth of a Child, Festival, and House Warming, although it will be appreciated that this example is not exhaustive.

At step 910, the individual selects an occasion, and for the purpose of this example it is assumed that the option of Birthday is selected. Additional information is then requested from the individual.

At step 915, the individual is prompted to enter beneficiary information using the digital wallet graphical user interface 1210. For instance, the individual may be presented with selection options, drop-down boxes or the like to facilitate the entry of details. In this example, the individual is able to select the age group, gender and location of the beneficiary. The individual is also prompted to enter the beneficiary's mobile number and/or email address. In one implementation, the individual may opt to look up these contact details in a contacts list on the individual's mobile device.

At step 920, the individual is then presented with a plurality of gift card templates relevant to the selected occasion and the beneficiary information and is allowed to select a gift card template. In this example, since Birthday was selected as the occasion, the gift card templates may all be birthday themed. In some examples, certain elements of the beneficiary information such as the gender or age of the beneficiary may also be used to determine which templates should be presented. For example, templates with traditionally feminine colours may be presented if the beneficiary's gender is Female but may not be presented if the beneficiary's gender is Male. The individual may browse the templates and select a gift card template by touching the desired template using the touch screen of the mobile device.

At step 925, the individual is allowed to enter a personalised message for the gift card, such as "Happy Birthday John". In some examples the digital wallet may propose a suitable message based on the selected occasion and beneficiary details.

At step 930, the individual then enters a value for the gift card. This may involve manually entering a numerical dollar value or the like, or selecting from common gift card values such as $20, $50 and so on. In this example, the individual is allowed to input a value range by setting minimum and maximum values, which in this case are set as $30 and $50 respectively.

The individual is given an opportunity to review the selections made in the previous steps and confirms the request at step 935. The request and associated information is collected by the digital wallet and subsequently transferred from the individual's mobile device to a server of the digital wallet platform operator at step 940.

At step 945, the server determines relevant gift card offers based on the occasion and beneficiary information received with the request. This may involve passing the information collected by the wallet to a real time decision engine which may use a rule based engine and predictive analysis to determine the most relevant available gift card offers from participating merchants. The real time decision engine will consider participating merchant details and whether merchants have preferred status.

In this regard, the real time decision engine may additionally access other beneficiary data the digital wallet platform operator may have stored in relation to the beneficiary, especially if the beneficiary already has his/her own digital wallet and this can be identified based on the beneficiary information. This other beneficiary data may be indicative of spending habits of the beneficiary and may reveal merchants preferred by the beneficiary or types of good services that the beneficiary frequently purchases. The real time decision engine may also access social network information associated with the beneficiary as part of the determination process. For example, a social network account name may be identified using the beneficiary information and used to access details of preferences of the beneficiary regarding goods and services and the companies that provide them.

Once the determination of relevant gift card offers has been made, at step 950 a number of relevant gift card offers are then to the individual in the digital wallet. For example, it may be determined that, for a Birthday of a beneficiary having a relatively young age, gift card offers from toy merchants are most likely to be desirable, and a number of offers from different toy merchants may be presented, having values within the value range entered at step 930.

In some examples, the gift card offers may include discount offers where a digital gift card can be obtained for a payment amount that is less than a redemption value of the gift card. In this example, the following gift card offers are presented for selection:

Toys 'R' Us: Pay $45, Get $50
Toy Station: Pay $30, Get $30
Toy Station: Pay $50, Get $55
Bookaburra: Pay $50, Get $50

It will be appreciated that whilst all of the above gift card offers involve payment amounts in the selected $30-$50 value range, some merchants offer discounts, and in the case of Toy Station, the discount is only offered on the higher value gift card on offer to encourage the individual to select the higher value gift card.

At step 955, the individual then selects a desired gift card offer. However, if none of the gift card offers are acceptable, the individual may be allowed to select an option to see alternative gift card offers or to manually select a merchant from a list of participating merchants.

At step 960, the individual inputs a security PIN for the gift card, although in some implementations the individual may opt to have the security PIN automatically generated.

At step 965, the individual is then prompted to select a payment account from the digital wallet to make the payment to the merchant offering the selected gift card offer. In this example, the individual select a preferred credit card account registered with his/her digital wallet for the payment.

The individual then authorises the payment at step 970. This may require an additional authentication step or may simply rely on the fact that the individual has already logged into the digital wallet at step 900, depending on the digital wallet configuration.

Once the payment is authorised, the digital wallet platform operator then processes the payment transaction by debiting the selected account of the individual and crediting the account of the merchant offering the selected gift card offer at step 975. This will utilise the standard payment processing techniques of the digital wallet which are well known in the art and thus will not be described in detail here. However, inn some examples, the digital wallet platform operator may issue a payment request to a separate payment gateway or financial institution to facilitate the payment transaction, rather than process the payment transaction directly.

Payment success confirmation is provided to the individual and the merchant at step 980. Upon receiving this confirmation, the merchant shares a unique gift card code with the server of the digital wallet platform operator at step 985. This unique gift card code will be issued by the merchant and details of the associated digital gift card will be stored by the merchant to facilitate later redemption of the digital gift card with the merchant. For example, the merchant may associate the unique gift card code with a redemption value of the digital gift card in a database which may be retrieved when the digital gift card is redeemed.

The digital gift card details are stored by the server at step 990. These details will typically include the unique gift card code and security PIN, together with at least the mobile number (or other contact details) of the beneficiary. The specific options selected for the gift card by the individual may also be stored, although in some examples, these may only be retained temporarily to allow the digital gift card notification to be generated.

Finally, in step 995, the digital gift card notification is sent to the beneficiary. This involves generating the digital gift card notification according to the options selected for the gift card by the individual, by using the selected gift card template, adding the personalised message, and providing indications of the merchant associated with and the redemption value of the digital gift card. The digital gift card notification may be sent as a message to the beneficiary using the mobile number entered by the individual. This message may include the full digital gift card notification or a link to a URL for allowing the beneficiary to navigate to a web hosted digital gift card notification online.

Further details of techniques for allowing the beneficiary to obtain and redeem the digital gift card after receipt of the digital gift card notification will be outlined below.

Figure 10A:
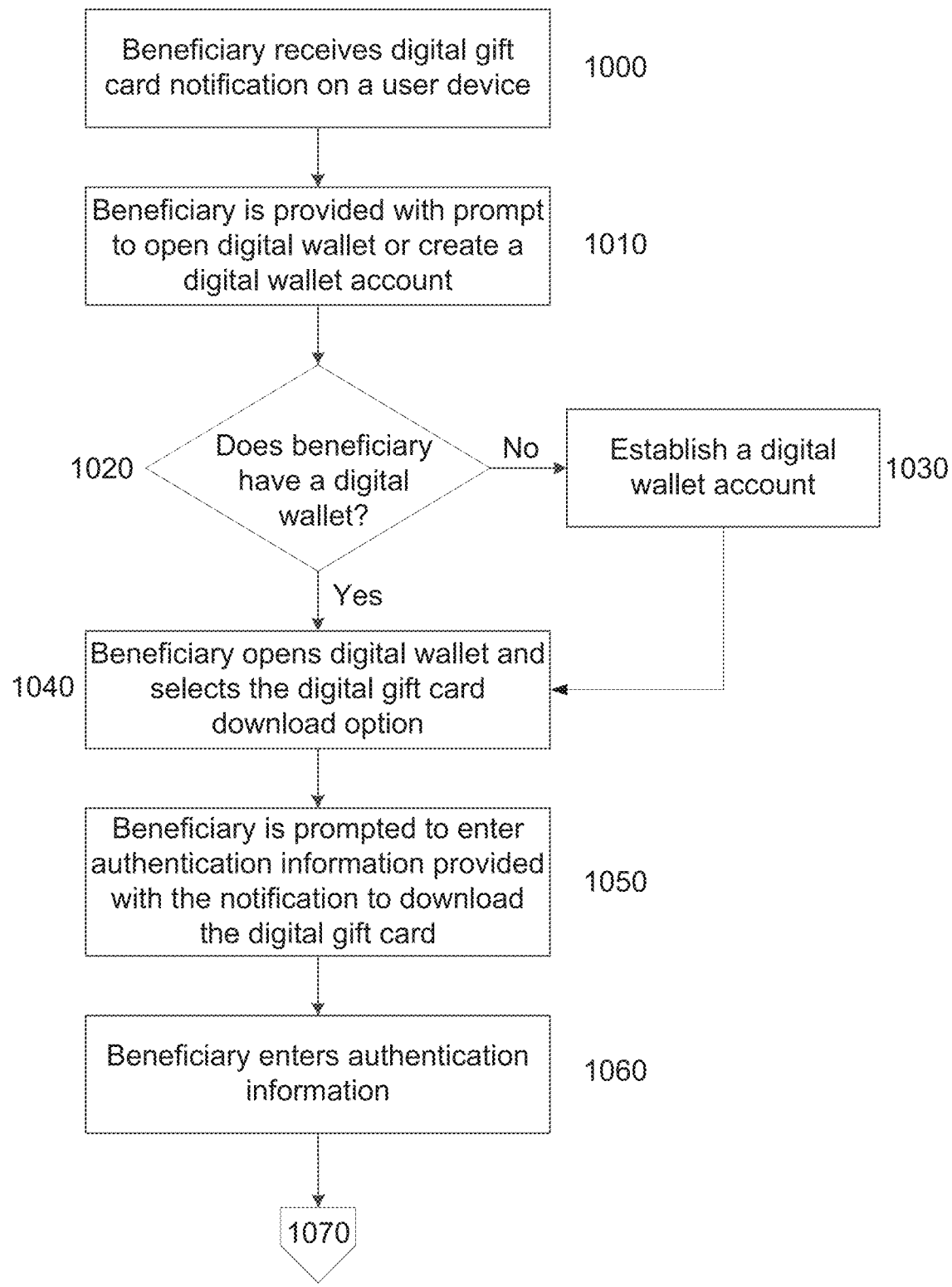
FIGS. 10A and 10B provide a flow chart of a specific method of providing a digital gift card to a beneficiary.
Figure 10B:
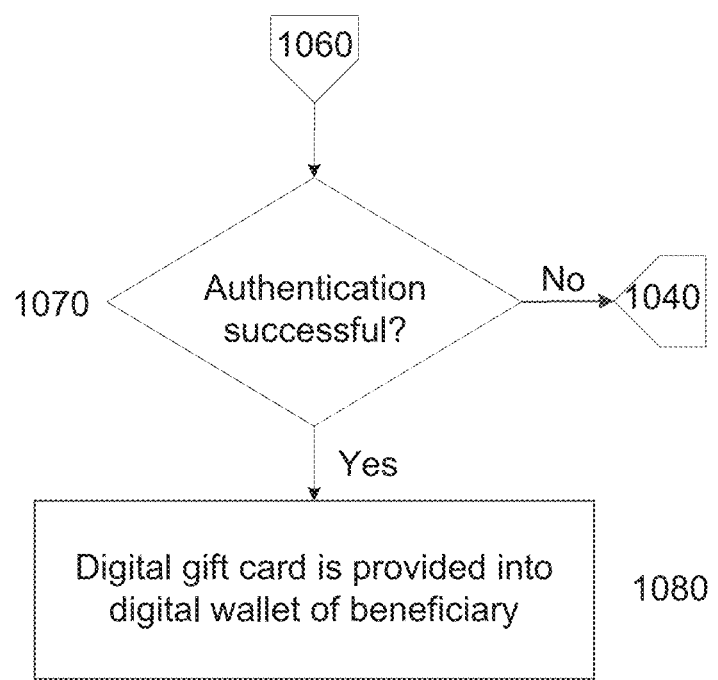

A further specific example of a method of providing a digital gift card to a beneficiary will now be described in more detail with reference to FIGS. 10A and 10B.

In this example, at step 1000 the beneficiary receives a digital gift card notification on their user processing device such as mobile phone or tablet. The notification is sent to the user device of the beneficiary via a communications network, typically a cellular network such as GSM or GPRS for example. The notification may be sent by any suitable means including for example via a text message, an automated call using text to speech conversion or via email.

The notification sent to the beneficiary will typically include authentication information associated with the digital gift card, which in an example is a PIN or other passcode created by the individual sending the digital gift card to the beneficiary. The notification may also include a prompt at step 1010 for the beneficiary to open their digital wallet in order to download the digital gift card. The prompt may further include a link or other suitable directions enabling the beneficiary to create a digital wallet account if they do not already have one.

At step 1020, the method includes determining whether the beneficiary has a digital wallet. If they do not, then at step 1030, the processing device assists the beneficiary to establish a digital wallet account which will typically involve downloading a digital wallet application onto their mobile device and registering a new account. Once a digital wallet account has been established or if the beneficiary already has a pre-existing digital wallet, at step 1040, the beneficiary opens their digital wallet (for example by signing in to a digital wallet application on their mobile device by providing suitable login credentials). The digital wallet user interface will provide an option to download digital gift card which the beneficiary is able to select.

After selecting the download digital gift card option in their digital wallet, the beneficiary will be prompted to enter the authentication information that was provided to them in the digital gift card notification (e.g. a PIN). At step 1060, the beneficiary enters the authentication information which is sent back to the processing device to authenticate the beneficiary.

At step 1070, the processing device determines whether authentication of the beneficiary was successful. As previously described, the processing device authenticates the beneficiary using the authentication information provided by the beneficiary and the authentication information associated with the digital gift card. For example, in the case of a PIN, the processing device determines whether the PIN received from the beneficiary matches the PIN associated with the digital gift card. The mobile phone number of the beneficiary associated with the digital gift card and PIN may also be checked against the mobile phone number associated with the beneficiary digital wallet from which the PIN was received.

After successful authentication, at step 1080, the processing device provides the digital gift card into the digital wallet of the beneficiary. Typically, the digital gift card (including a unique gift card code generated by the merchant) is downloaded into the digital wallet of the beneficiary ready for use in performing a payment transaction with the merchant. If authentication at step 1070 was not successful, then the beneficiary may be prompted to enter the authentication again at step 1040.

Figure 11A:
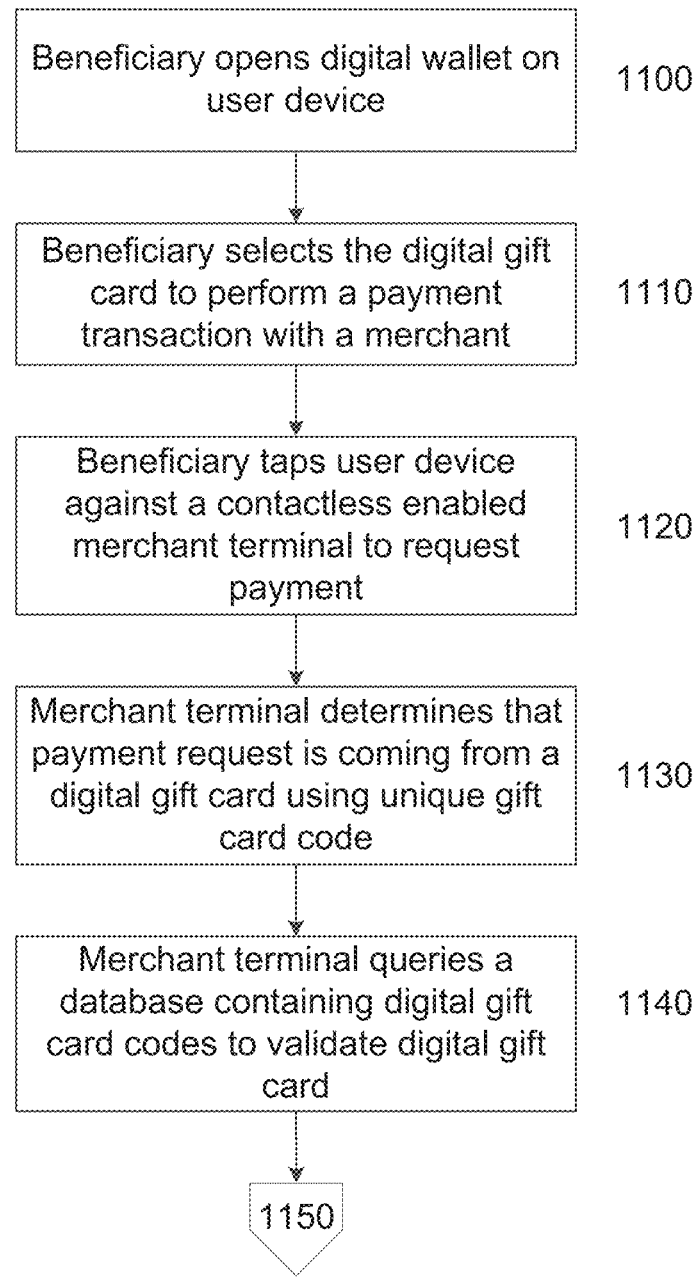
FIGS. 11A and 11B provide a flow chart of a specific method of performing a payment transaction with a merchant using a digital gift card; and, FIG. 12 is an example of a digital wallet graphical user interface displayed on a smartphone.
Figure 11B:
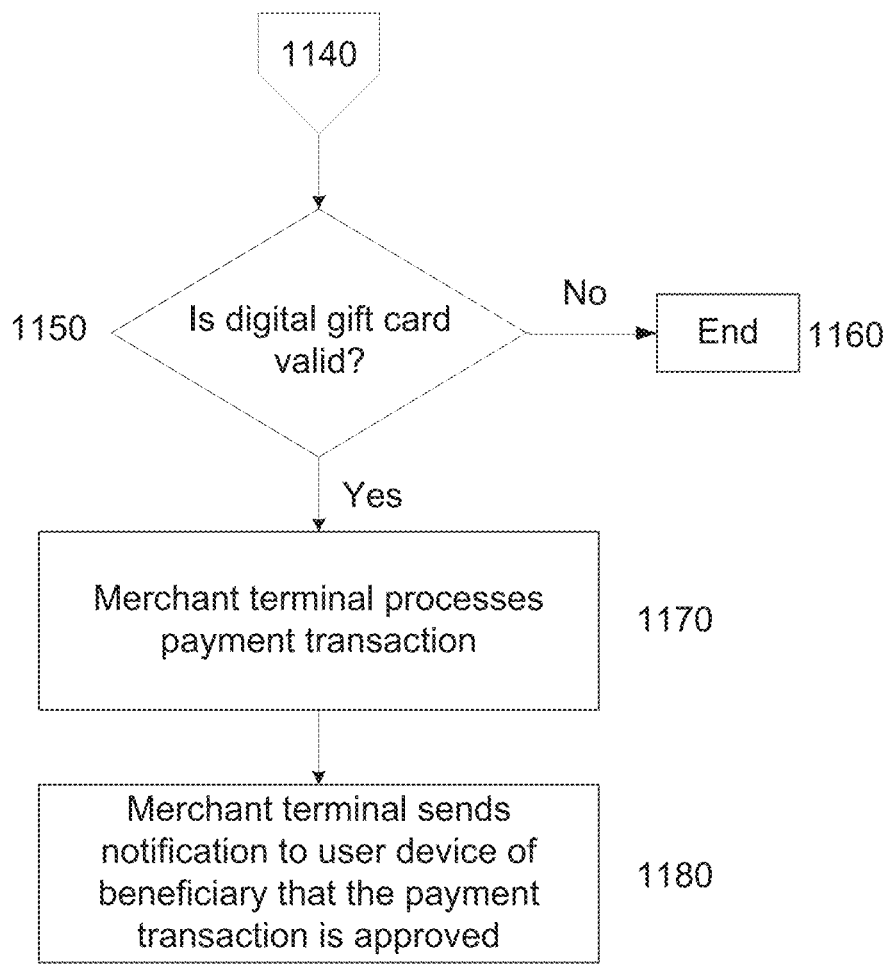

A specific example of a method of performing a payment transaction with a merchant using a digital gift card will now be described in more detail with reference to FIGS. 11A and 11B. In this example, the beneficiary redeems their digital gift card in a merchant store using a contactless enabled merchant terminal.

At step 1100, the beneficiary opens their digital wallet on their user device, for example by signing in to a digital wallet application on their device by providing suitable login credentials. The digital wallet will include an option to perform a payment transaction using the digital gift card. At step 1110, the beneficiary selects the digital gift card in their digital wallet to perform the payment transaction with the merchant.

At step 1120, the beneficiary taps their user device against a contactless enabled merchant terminal which is configured to allow communication with the digital wallet. For example, near field communication (NFC) may be used to transfer information between the digital wallet and payment terminal, although any other suitable contactless payment processing technique may be used capable of transferring the unique gift card code from the digital wallet of the user device to the payment terminal.

At step 1130, the merchant terminal determines that the payment request has come from a digital gift card (as opposed to a bank card for example). In one example, this determination is made upon receiving the unique gift card code which acts to identify the incoming payment request as that from a digital gift card. Having determined that the payment request is coming from a digital gift card, the merchant terminal may then execute a validation routine to validate the digital gift card.

At step 1140, the merchant terminal queries a database containing digital gift card information including unique gift card codes to validate the digital gift card presented by the beneficiary. The database may be linked to a merchant application for example which then sends a validation response back to the merchant terminal. In determining whether or not the digital gift card is valid at step 1150, typically, the unique gift card code presented by the beneficiary is matched with a unique gift card code saved in the merchant database.

In addition to using the unique gift card code to validate the digital gift card, the validation process may also include determining whether the digital gift card associated with the unique gift card code has expired or been used or whether it is redeemable for the goods or services involved in the transaction.

If validation is successful, at step 1170 the merchant terminal processes the transaction using the digital gift card using any suitable payment processing technique known in the art. Finally, at step 1180 a notification may be sent to the user device of the beneficiary to advise that the transaction using the digital gift card has been approved. If the validation at step 1150 is not successful, the payment transaction process will end at step 1160.

In another example, the above discussed methods may be implemented by carrying out the following steps:
1. A digital wallet user opens their digital wallet and selects an option to create a gift card/e-gift voucher;
2. The user is presented with a list of occasions (for example: Birthday, Anniversary, Wedding, House Warming, Diwali, Christmas, Promotion, Others) and selects one occasion;
3. For the selected occasion, the user browses a number of pre-configured gift card templates and selects one template;

4. For the selected occasion, the user is presented with a list of merchants that are determined to be relevant to the occasion (merchants could be, for example: ecommerce sites, retail shops, restaurants, airline, etc.) and selects one merchant;
5. For the selected merchant, the user is given an option to add a personalized message to the gift card selected (for example: Happy Birthday to XXX, From XXX);
6. The user enters a gift card value (for example: $10, $20, $50, $100, etc.);
7. The user confirms the details of the gift card and enters a personalized PIN for the gift card;
8. The consumer enters a mobile number of the beneficiary;
9. The user selects a bank account or credit card account in the digital wallet to pay for the gift card and authorises the transaction to proceed;
10. A payment request is issued by the digital wallet operator and the selected user account is debited and the merchant account is credited accordingly;
11. The merchant generates a unique code for the gift card and responds back to the digital wallet operator;
12. The beneficiary receives a notification on their smart phone, including a personalized message regarding the gift card and the PIN;
13. The beneficiary opens his/her own digital wallet and selects an option to download the gift card to the digital wallet;
14. The beneficiary enters the PIN to authenticate the gift card;
15. Upon a successful authentication, the digital gift card is downloaded including the unique code for the gift card;
16. The beneficiary can redeem the digital gift card in the selected merchant's retail store, of pay by gift card on the merchant's ecommerce site.

In view of the above, it will be appreciated that the above described techniques for providing a digital gift card using a digital wallet will provide an individual with a convenient alternative to giving cash or conventional gift cards as a gift. The inherent risks of loss or theft of physical cash or gift cards are removed since the digital gift card is provided electronically to the beneficiary. However, unlike electronic funds transfers, the digital gift card can be personalised by the individual giving the gift, thus making the digital gift card a more personable gift option than merely transferring funds.

As discussed previously, by integrating the digital gift card functionality into a digital wallet platform, this can provide a useful value add feature of the digital wallet platform, which can encourage greater adoption of the digital wallet platform by new users, particularly if they are the beneficiaries of digital gift cards from other users.

Merchants can also have an improved experience by having their gift card offers reach wider audiences and by having the digital gift card creation, payment and redemption processes handled electronically this can reduce the burden on merchants for operating a gift card system.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method of providing a digital gift card to a beneficiary, the method including, in one or more electronic processing devices:
    a) receiving, from a digital wallet of an individual, a request to create a digital gift card including information indicative of at least one of:
        i) an occasion associated with the digital gift card; and,
        ii) beneficiary information associated with the beneficiary;
    b) determining, based on at least one of the occasion and the beneficiary information, a plurality of gift card offers offered by respective merchants, wherein the respective merchants are identified from data obtained through at least a social media feed of the beneficiary, the data being associated with one or more merchants in the social media feed or related merchants of the one or more merchants in the social media feed;
    c) presenting to the individual, from the digital wallet via a real-time decision engine, the plurality of gift card offers using a rules-based analysis or predictive analysis to arrange the gift card offers in an order of relevance determined from at least one of the social media feed or the social media information of the beneficiary;
    d) receiving, from the digital wallet, an indication of a selected gift card offer;
    e) processing a payment dependent on the information from the digital wallet to the merchant offering the selected gift card offer; and,
    f) sending a digital gift card notification for the selected gift card offer to the beneficiary, to thereby allow the beneficiary to obtain the digital gift card in a digital wallet of the beneficiary and redeem the digital gift card with the merchant using the digital wallet of the beneficiary.

2. A method according to claim 1, further comprising determining the plurality of gift card offers based on both the occasion and the beneficiary information.

3. A method according to claim 1, wherein the beneficiary information includes at least one of:
    a) an age group of the beneficiary;
    b) a gender of the beneficiary;
    c) a location of the beneficiary; and,
    d) contact details of the beneficiary.

4. A method according to claim 3, wherein the contact details include at least one of:
    a) a mobile telephone number of the beneficiary;
    b) an email address of the beneficiary; and,
    c) a social network account name associated with the beneficiary.

5. A method according to claim 3, further comprising obtaining the beneficiary information by:
    a) receiving, from the digital wallet, contact details of the beneficiary;
    b) identifying the beneficiary digital wallet of the beneficiary based on the contact details; and,
    c) obtaining the beneficiary information from the beneficiary digital wallet.

6. A method according to claim 1, further comprising obtaining the beneficiary information by having the individual manually enter the beneficiary information from the digital wallet.

7. A method according to claim 1, further comprising:
a) receiving, from the digital wallet, a value for the digital gift card; and,
b) presenting the gift card offers having the received value.

8. A method according to claim 1, further comprising:
a) receiving, from the digital wallet, a value range for the digital gift card; and,
b) presenting the gift card offers with values within the received value range.

9. A method according to claim 1, further comprising obtaining the occasion by:
a) presenting, from the digital wallet, a plurality of occasion options; and,
b) receiving, from the digital wallet, a selection of one of the occasion options.

10. A method according to claim 1, further comprising:
a) using the beneficiary information to access social network information and the social media feed associated with the beneficiary; and,
b) determining the one or more gift card offers based on at least some of the social network information or the social media feed.

11. A method according to claim 1 further comprising determining the one or more gift card offers by selecting gift card offers offered by participating merchants.

12. A method according to claim 1, further comprising presenting the gift card offers offered by the one or merchants in an order based on at least one of:
a) whether a merchant is a preferred merchant; and,
b) a degree of relevance to the beneficiary determined based on the beneficiary information.

13. A method according to claim 1, wherein at least one of the gift card offers includes a discount offer in which a payment amount required for the gift card offer is less than a redemption value for the gift card offer.

14. A method according to claim 1, further comprising:
a) receiving, from the digital wallet, personalisation options; and
b) generating the digital gift card notification based on the personalisation options.

15. A method according to claim 14, further comprising:
a) presenting, from the digital wallet, a plurality of gift card templates relevant to the occasion;
b) receiving, from the digital wallet, an indication of a selected gift card template; and,
c) generating the digital gift card notification in accordance with the selected gift card template.

16. A method according to claim 14, further comprising:
a) receiving, from the digital wallet, a personalised message; and,
b) generating the digital gift card notification including the personalised message.

17. A method according to claim 1, further comprising generating the digital gift card notification including authentication information for the digital gift card.

18. A method according to claim 17, further comprising obtaining the authentication information by having the individual manually enter the authentication information from the digital wallet.

19. A method according to claim 17, further comprising, after processing the payment:
a) receiving, from the merchant offering the selected gift card offer, a unique gift card code; and,
b) associating the unique gift card code with the authentication information and at least some of the beneficiary information.

20. A method according to claim 19, further comprising:
a) receiving, from the digital wallet of the beneficiary:
i) a request to obtain the digital gift card; and,
ii) authentication information for the digital gift card;
b) authenticating the digital gift card using the authentication information; and,
c) providing the digital gift card in the digital wallet of the beneficiary.

21. A method according to claim 1, further comprising, after redeeming the digital gift card, sending a notification to the individual that the beneficiary has redeemed the digital gift card on a particular date and at a particular merchant/location.

22. A method according to claim 1, wherein the rules-based approach or predictive analysis used in arranging the gift card offers further comprises:
accessing additional beneficiary information stored in a digital wallet of the beneficiary to determine spending habits, preferred merchants, or purchased goods or services; and
ranking the gift card offers based on a beneficiary's preference of one or more of products, services, or merchants.

23. A system for providing a digital gift card to a beneficiary, the system including one or more electronic processing devices configured to:
a) receive, from a digital wallet of an individual, a request to create a digital gift card including information indicative of at least one of:
i) an occasion associated with the digital gift card; and,
ii) beneficiary information associated with the beneficiary;
b) determine, based on at least one of the occasion and the beneficiary information, a plurality of gift card offers offered by respective merchants, wherein the respective merchants are identified from data obtained through at least a social media feed of the beneficiary, the data being associated with one or more merchants identified in the social media feed or related merchants of the one or more merchants in the social media feed;
c) present, from the digital wallet by executing code to implement a real-time decision engine, using a rule-based analysis or predictive analysis to arrange the plurality of gift card offers in an order of relevance determined from at least one of the social media feed or the social media information of the beneficiary;
d) receive, from the digital wallet, an indication of a selected gift card offer;
e) process a payment from the digital wallet to the merchant offering the selected gift card offer; and,
f) send a digital gift card notification for the selected gift card offer to the beneficiary, to thereby allow the beneficiary to obtain the digital gift card in a beneficiary digital wallet of the beneficiary and redeem the digital gift card with the merchant using the beneficiary digital wallet.

24. A system according to claim 23, wherein the one or more electronic processing devices include:
a) a user processing system for providing a user interface for the digital wallet; and,
b) a server processing system coupled to the user processing system via a communications network.

25. A system according to claim 24, wherein the one or more electronic processing devices further include a merchant processing system coupled to the server processing system via the communications network.

26. A system according to claim 25, wherein the server processing system is configured to send a notification to the individual that the beneficiary has redeemed the gift card on a particular date and at a particular merchant/location.

27. A system according to claim 23, wherein in using rules-based approach or predictive analysis used in arranging the plurality of gift card offers the one or more electronic processing devices is configured to:
- access additional beneficiary information stored in a digital wallet of the beneficiary to determine spending habits, preferred merchants, or purchased goods or services; and
- ranking the gift card offers based on a beneficiary's preference of one or more of products, services, or merchants.

* * * * *